United States Patent
Hopson et al.

(10) Patent No.: US 7,590,567 B2
(45) Date of Patent: Sep. 15, 2009

(54) ONLINE SHOPPING SYSTEM

(75) Inventors: David B. Hopson, Arvada, CO (US); Kemberly S. Keys, Golden, CO (US)

(73) Assignee: The Kroger Co., Cincinnati, OH (US)

( * ) Notice: Subject to any disclaimer, the term of this patent is extended or adjusted under 35 U.S.C. 154(b) by 394 days.

(21) Appl. No.: 11/548,045

(22) Filed: Oct. 10, 2006

(65) Prior Publication Data

US 2007/0136146 A1 Jun. 14, 2007

Related U.S. Application Data

(62) Division of application No. 10/265,614, filed on Oct. 7, 2002, now Pat. No. 7,124,098.

(51) Int. Cl.
*G06Q 30/00* (2006.01)

(52) U.S. Cl. ...................................................... 705/26

(58) Field of Classification Search .................. 705/26, 705/27, 500
See application file for complete search history.

(56) References Cited

U.S. PATENT DOCUMENTS

| | | | | |
|---|---|---|---|---|
| 5,960,411 | A * | 9/1999 | Hartman et al. | 705/26 |
| 6,029,141 | A * | 2/2000 | Bezos et al. | 705/27 |
| 6,539,386 | B1 * | 3/2003 | Athavale et al. | 707/10 |
| 6,654,726 | B1 * | 11/2003 | Hanzek | 705/26 |
| 6,701,299 | B2 * | 3/2004 | Kraisser et al. | 705/8 |
| 6,985,871 | B2 * | 1/2006 | Simon et al. | 705/8 |
| 7,124,098 | B2 * | 10/2006 | Hopson et al. | 705/26 |
| 7,139,721 | B2 * | 11/2006 | Borders et al. | 705/9 |
| 7,177,825 | B1 * | 2/2007 | Borders et al. | 705/26 |
| 2001/0042024 | A1 * | 11/2001 | Rogers | 705/26 |
| 2003/0033181 | A1 * | 2/2003 | Simon et al. | 705/7 |
| 2007/0055580 | A1 * | 3/2007 | Woodward et al. | 705/26 |
| 2009/0094085 | A1 * | 4/2009 | Kantarjiev et al. | 705/8 |

FOREIGN PATENT DOCUMENTS

JP 2002083135 A * 3/2002

OTHER PUBLICATIONS

Wren, W., "Albertson's Expects Online Grocery Shopping to Boom," Forth Worth Star-Telegram, Nov. 9, 1998.*
Massingill, T., "Online Grocers on Road to Deliver in California's Bay Area," Contra Costa Times, May 21, 1999.*
Anon., "The Columbian, Vancouver, Wash., Business Briefing Column," Columbian, Jan. 26, 2000.*
Anon., "Kokuyo to Take Online Orders for Office Equipment," Nikkei Net Interactive, May 1, 2000.*

(Continued)

*Primary Examiner*—Nicholas D Rosen
(74) *Attorney, Agent, or Firm*—Wood, Herron & Evans, LLP

(57) ABSTRACT

An online shopping system that permits a customer to submit online orders for items and/or services from a store that serves both walk-in customers and online customers. The online shopping system presents an online display of an order cutoff time and an associated delivery window for items selected by the customer. The system accepts the customer's submission of a purchase order for the item in response to a time of submission being before the order cutoff time. The online shopping system does not settle with a credit supplier of the customer until the item selected by the customer is picked from inventory but before it is delivered. Therefore, the customer can go online and make changes to the order. In addition, available service windows are presented to the customer as a function of customer selected order and service types; and further, the order picking is assigned in accordance with a picker's preference.

14 Claims, 11 Drawing Sheets

OTHER PUBLICATIONS

Anon., "Daewoo Picks Exel Division," Motor Transport, May 17, 2001, p. 24.*
Reinhardt, A., "Tesco bets Small—and Wins Big: Britain's Top Supermarket Chain Was Slammed for its Go-Slow Approach to Selling Goods over the Net. Now It's the World's Largest Online Grocer," Business Week, No. 3751, p. EB26, Oct. 1, 2001.*

* cited by examiner

ONLINE SHOPPING SYSTEM

RELATED APPLICATIONS

The present application is a Divisional Application of application Ser. No. 10/265,614, filed Oct. 7, 2002, now U.S. Pat. No. 7,124,098, which is hereby expressly incorporated by reference herein.

FIELD OF THE INVENTION

This invention relates generally to the field of electronic commerce and more particularly, to an improved online shopping system.

BACKGROUND OF THE INVENTION

For a number of years, shopping over the internet has grown increasingly popular for both business and personal use as more merchants offer goods and services through associated websites. Normally, with an internet based shopping system, a customer accesses a website, views products and/or services and associated specifications, chooses a product and/or service for purchase, selects a delivery option, provides delivery and credit card payment information and authorizes a purchase transaction.

When ordering goods, many shopping systems provide a virtual shopping cart for holding items selected for purchase. Successive items selected for purchase are placed into the virtual shopping cart until a customer completes their shopping trip. Virtual shopping carts may be examined at any time, and their contents can be edited or deleted at the option of the customer. Once the customer decides to submit a purchase order, the customer may print the contents of the virtual shopping basket in order to obtain a hard copy record of the transaction.

Internet based shopping systems allow a customer a great deal of flexibility, and certain types of shopping systems have proven more successful than others. For example, shopping systems that offer commonly purchased and relatively higher priced goods/services are more economically feasible. For example, the sale of clothing, computers and airline tickets via electronic commerce has proven successful. Those shopping systems often provide shopping at a website owned by the brand name supplier, and therefore, competitive products do not have to be accommodated. Further, the higher priced goods/services provide the supplier with a higher average value and more cash flow per order. In addition, delivery is often provided by a third party delivery service with which the customer is often familiar; and in addition, the customer's expectations regarding delivery are based on the capabilities and experience with known delivery services. Most often, a customer is satisfied knowing a day or a range of days for the delivery. Also, with most electronic commerce systems, the goods are not perishable and do not require special handling. Finally, in many situations, the goods are available in their original packaging and do not have to be specially handled or repackaged for electronic commerce customers.

Electronic commerce or internet shopping systems for groceries are also available. However, grocery items are normally lower cost items, and often more items are required for purchase in order to provide an economically feasible minimum order. Further, an online grocery shopping system must provide numerous brand names for each item, each of which has unique product specifications, and that complicates the viewing and ordering process not only for the shopping system provider but also the customer. Also, once an order for grocery items is placed, often items, for example, produce, cannot be shipped in their original packaging and therefore, require special handling and repackaging. In addition, customers of grocery shopping expect that their order will be available and/or delivered within a relatively small time window, for example, a couple of hours, either on the day that the order is placed or, a day in the near future. Further, often a commercial delivery service does not exist that fulfills the needs of an online grocery shopping system. Therefore, the delivery must be provided by the supplier of the electronic commerce shopping system, and most often, such a supplier has little or no delivery capability and even less knowledge regarding how to execute an efficient delivery system.

As a consequence of the above, grocery shopping via electronic commerce has had only limited success. Often, to achieve economic success, the shopping service must be limited; and that, in turn, limits the capability of the grocery shopping service to fulfill the needs of the customer. Hence, the customer often is not satisfied shopping for groceries using an online or internet shopping system.

To improve customer satisfaction, there is a need for an improved and more flexible item ordering system. For example, with known systems, once a customer submits an order at the end of an online shopping session, the order is settled with a credit supplier and cannot be changed by the customer. Although this may be acceptable with many electronic shopping systems, it presents difficulties in an online grocery shopping system. Grocery shopping most often involves the purchasing of numerous, relatively low valued items, and it is common for a customer to later remember an item that was not purchased during the online shopping session. Placing another order for one or two items is not practical because of the minimum value requirement that is associated with each online order. Some shopping systems permit the customer to call in and supplement the order, however, such a capability is labor intensive and very inefficient and costly for the internet shopping system provider. Therefore, there is a need for a electronic commerce shopping system that permits a customer to return to the website and change the order after it has been submitted. Such a feature is more time efficient for both the customer and the shopping system provider and substantially more cost efficient for the shopping system provider.

There is a further need for an improved and more flexible delivery or service window capability. Known electronic shopping systems present available delivery windows to a customer based on delivery capacity and order volume, and the customer then selects one of the presented available delivery windows. However, in addition to the delivery of groceries, the online shopping system provider may permit a customer to pick up an order. Further, the online shopping system provider may also offer different order types for complementary goods and services, for example, flowers, food preparation and catering services. The availability and lead times for these other goods and services require that they have service windows that are different from the delivery windows associated with grocery shopping. Thus, there is a need for an electronic shopping system with the capability to present online customer service windows that are unique to different combinations of order types and pick up/delivery services provided.

There is also a need for an improved and more efficient system for picking the items necessary to fill an order. With known systems, orders are received, and picking lists are created that identify the goods, their location and thus, the order in which they are to be picked. However, with known systems, pickers are assigned picking lists as needed. While such systems are adequate in most environments, in a grocery shopping system, the picking process is more complicated. First, a large grocery store has a very large number of different departments, each having a large number of goods and brand names. To be efficient, arbitrarily assigning pickers to pick throughout the store requires that all of the pickers have a substantial knowledge regarding the brand names and locations of goods throughout the store. Such a vast knowledge is very difficult to quickly instill in a picker. Further, pickers often pick goods for different orders that are to be shipped by different carriers. With such a process, it is possible for an order to be inadvertently placed on the wrong delivery route or vehicle, thereby requiring that the order be returned and redelivered to the correct customer. Not only is the customer dissatisfied, but there is a substantial unrecoverable cost added to the order. Therefore, there is a need for an improved and more reliable order picking process.

There is a still further need for a more comprehensive post delivery customer service. Often when a customer has a complaint with a local grocery store, the customer either makes a phone call or returns to the store. In either event, the handling and resolving of the complaint by the grocery store requires the time of a store manager or similar person. The personalized handling of customer problems on the store premises can consume a substantial amount of time. If the requirement to service customer problems based on an online ordering and delivery service is superimposed on top of the servicing of the problems of walk-in customers, the customer service function can become a substantial burden on available resources. Therefore, there is a need to find a more efficient process and system for handling questions and problems that may arise with online customers.

SUMMARY OF THE INVENTION

The present invention provides an online shopping system for groceries and related goods and services that is more flexible and efficient than known services. The online shopping system of the present invention permits a customer to change an order after it has been submitted by the customer on the webpage. By permitting the customer to make changes to the order after submission, the online shopping system better accommodates the needs of a customer shopping for groceries. Further, that flexibility relieves the provider of the online shopping system from having to address those customer order changes with customer service resources. Thus, that relatively simple capability has the potential of substantially improving customer satisfaction with the online shopping system and eliminating a potential substantial use of customer service resources.

In accordance with this embodiment, the invention provides an online shopping system that permits a customer to submit online orders for items and/or services from a store that serves both walk-in customers and online customers. The online shopping system first presents identifications of items on a web page for selection by a customer. An online display acknowledging the customer's selection of the an item is then presented as well as an online display of an order cutoff time and an associated delivery window selected by the customer. The system next presents an online display permitting the customer to submit a purchase order for the item; and upon receiving a submission of a purchase order for the item, the system compares a time of submission of the purchase order to the order cutoff time associated with the delivery window. An online display is then presented that accepts the customer's submission of the purchase order for the item in response to the time of submission being before the order cutoff time.

One aspect of the above invention is that the online shopping system does not settle with a credit supplier of the customer until the item selected by the customer is picked from inventory but before it is delivered.

The online shopping system of the present invention has a further capability of providing to a customer available service windows for different order types. In other words, if a customer is ordering groceries, a first set of available service or delivery windows is provided to the customer for selection; however, if a different order type is being submitted, for example, for flowers, catering services or a pick up order, respectively different sets of available service windows are provided to the customer. This added flexibility permits the provider of the online shopping system to better schedule and allocate resources.

In accordance with this embodiment, the invention provides an online shopping system that first presents an online display permitting a customer to select one of two order types and one of two service types, each of the order types being limited to specific items and/or services not available with other order types. Thereafter, in response to receiving an online request from the customer to display service windows for selected order and service types, the system retrieves all possible service windows for the selected order and service types over a time and/or date interval. Next, the online shopping system identifies available service windows for the selected order and service types by eliminating service windows that first, have a time and date earlier than a current time and date plus a lead time for the selected order and service types and second, exceed system resources to pick and deliver items selected by the customer associated with the selected order and service types. The system then presents to the customer an online display of the available service windows for the selected order and service types. In one aspect of this invention, the order types are grocery, flowers, catering services and liquor; and the service types are delivery, pick up and print a shopping list.

The online shopping system of the present invention provides a substantially improved method of assigning pick routes. A large grocery store has a very large number of different goods and brand names that are spread over a large area. Normally, personnel are assigned to work in particular departments, for example, meats, produce, etc.; and after a period of time, such personnel become very familiar with the goods, their location, the brand names and the age of the inventory in such departments. Thus, with the present invention, the assignment of pick routes for orders is determined by the experience and preference of a picker for a particular area of the store. Thus, the very important labor intensive picking process is performed with greater efficiency, and there are fewer picking errors.

In accordance with this embodiment, the invention provides an online shopping system that determines pick routes by first detecting an available picker and identifying a picker's preferred pick zone. Next, the system retrieves all orders having items to be picked and having imminent departure times and then, prioritizes the orders on the basis of orders that have items in picker's preferred pick zone. The system then assigns orders in order of highest priority to a pick route.

The opportunity for errors and customer dissatisfaction is significantly greater in a grocery shopping experience than with other shopping experiences. It would be a substantial burden for current store management personnel to resolve all of the problems arising from customers engaged in the walk-in shopping experience as well as, via telephone, the customers engaged in the online shopping experience. Thus, the online shopping system of the present invention provides a substantially improved and more automated customer service function. Online customers are able to submit service requests online, and the customer can check online the progress of the resolution of the service request. Such a service function is easier for the customer and can be centralized and handled by customer service specialists, thereby relieving the customer service load on store management personnel.

In accordance with this embodiment, the invention provides an online shopping system that presents an online display permitting a customer to submit an online service request relating to an online order previously delivered to the customer. The system stores the online service request, and an action is assigned to the service request by a customer service representative. Upon receiving an online inquiry from the customer relating to a status of the online service request, the system presents the customer a display representing the status of the online service request.

These and other objects and advantages of the present invention will become more readily apparent during the following detailed description taken in conjunction with the drawings herein.

DETAILED DESCRIPTION OF THE INVENTION

Figure 1:
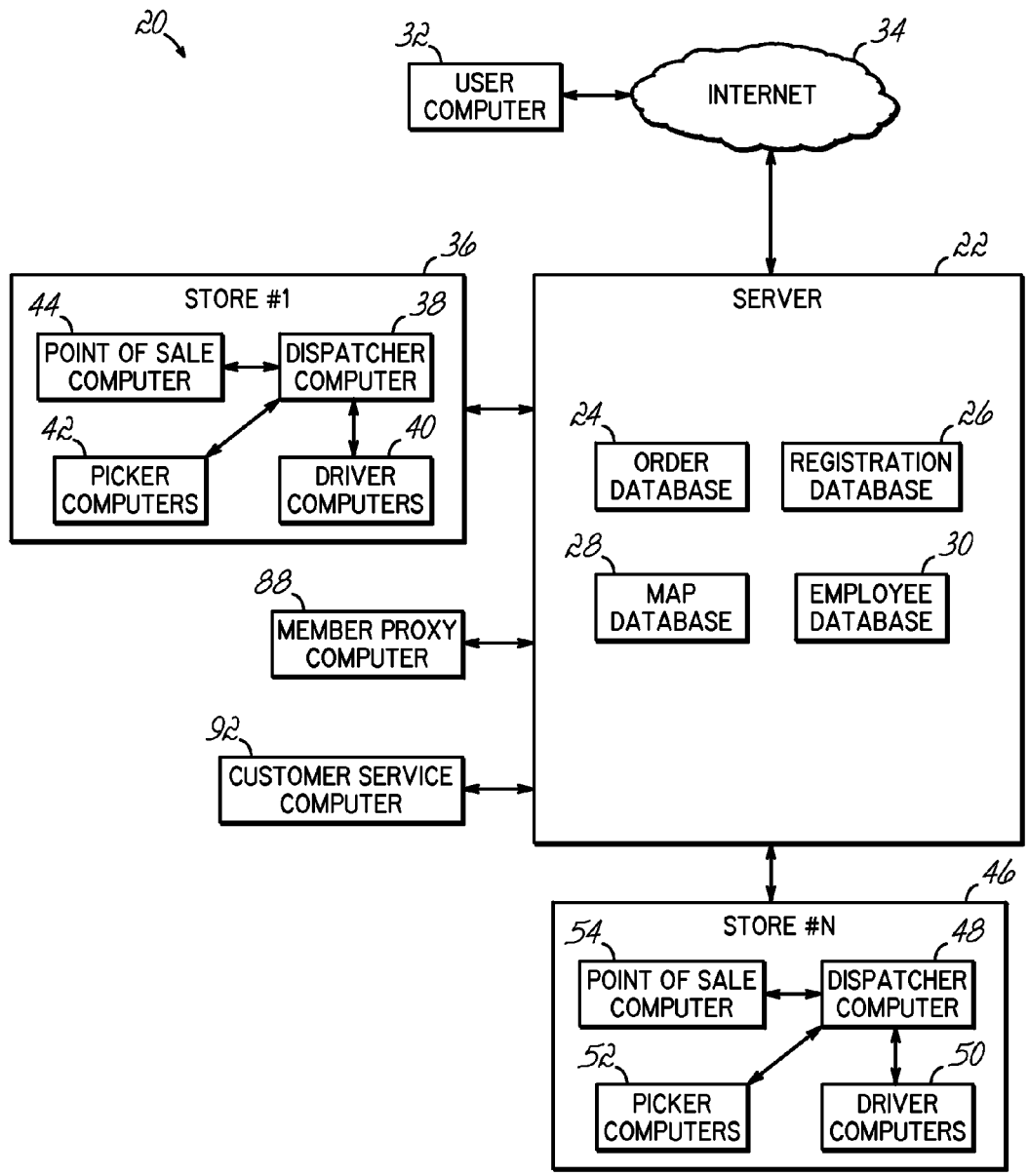
FIG. 1 is an overall schematic block diagram of an online shopping system in accordance with the principles of the present invention.

Referring to FIG. 1, the online shopping system 20 includes a central server 22 that contains the various databases fundamental to the operation of the ordering system, for example, an order database 24, a registration database 26, a map database 28 and an employee database 30. The order database 24 contains various tables that are utilized to store data relating to items available for sale, customers, customer orders, delivery addresses, etc. The registration database 26 has tables that contain data relating to the registration of users that is required to transact business on the online shopping system 20. The map database 28 has tables that contain data relating to addresses and maps of the geographic area served by the online shopping system, and the employee data base 30 has tables that contain data relating to persons who work with the online shopping system, for example, dispatchers, pickers, drivers, member proxies, customer service representatives, etc. The server 22 can be in any geographic location.

In order to use the online shopping system 20, a customer or user computer 32 accesses the server 22 via an internet connection 34. As will be appreciated, there are often many computers and servers utilized in creating the internet connection 34; and further, the server 22 is normally protected by further computers and servers providing a firewall and other security measures. Also connected to the server 22 are computers in a store 36 that may be, for example, a retail grocery store. The computers in the store 36 that are in electrical communications with the server 22 include a dispatcher computer 38, a driver computer 40 and a picker computer 42. A point of sale computer 44 that contains all of the pricing information is in electrical communications with the dispatcher computer 38. In addition to the store 36, any number of other stores 46 may also be in electrical communication with the server 22. Further, each of those other stores 46 will have a similar computer network comprised of a dispatcher computer 48, driver computer 50, picker computer 52 and point of sale computer 54.

The server computer 22 and the stores 36, 46 are normally in a common geographic area. Consequently, the databases 24-30 within the server 22 contain data that is unique to that geographic area in terms of customer identification, goods and services available for sale, addresses and maps, etc. The order database 24 contains information relating to all of the items available for sale, customers, all of the customer orders, customer addresses, etc. The registration database 26 contains member names, passwords and other information relating to the registration of users that is required to transact business on the online shopping system 20. The map database 28 contains all of the addresses served by the online shopping system 20 and geographic information necessary to create delivery routes to customers within the area of service of the online shopping system 20. The employee database 30 contains information associated with all of the employees who work with the online shopping system 20 as well as their various security levels and passwords.

Figure 2:
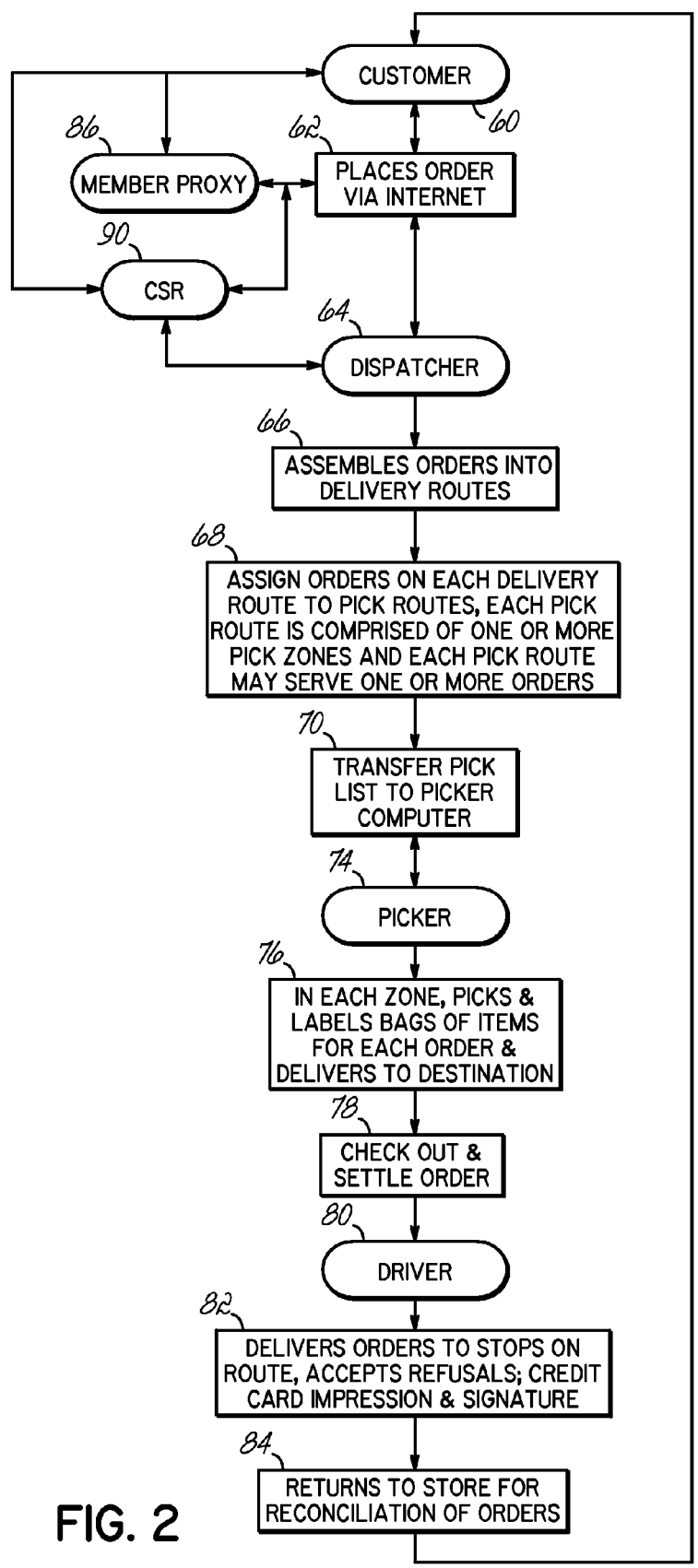
FIG. 2 is a chart identifying the actors that operate within the online shopping system of FIG. 1 and their general responsibilities.

The actors and their respective responsibilities are schematically illustrated in FIG. 2. Referring to FIGS. 1 and 2, a customer 60 utilizing a customer computer 32 establishes a connection via the internet 34 with the server 22 and, at 62, places an order via the internet. Thus, to place an order, the only requirement is that the customer computer 32 have an appropriate connection with the internet 34. The customer 60 and customer computer 32 can be located anywhere in the world. After receiving the delivery address of the customer, the online shopping system can determine which of the stores should fill the order, for example, store 36. The online shopping system 20 has the capability of providing different order types, for example, groceries, flowers, liquor, catering, etc. and different service types, for example, delivery, pick up, print shopping list, etc. Further, the online shopping system 20 has the capability of determining and displaying to the customer a set of available service windows that arise from different combinations of order and service types. Available service windows are time windows on a date when the order can be delivered or picked up that are selectable by a customer. For example, available service windows for grocery orders will be different from available service windows for catering services; and available delivery windows for flower orders or liquor orders will be different from grocery and catering service delivery windows. Further, available service windows for the delivery of grocery orders will be different from the available service windows for the pick up of grocery orders. After selecting an available service window, the customer proceeds to select items for purchase on the order. The customer's order is stored in the order database 24 of the server 22 and is accessible by the computers located in the store 36.

A further feature of the online shopping system 20 is that upon the customer selecting an available service window, the system provides for display to the customer an order cutoff time and date. The order cutoff time and date is normally a few hours before the start of the service window, and is normally determined by the system administrator. After submitting the order for fulfillment and logging out of the online shopping system, the customer can at any time before the order cutoff time and date use a customer computer 32 to again log in to the online shopping system 20 and change the submitted order without charge or penalty.

At some time after the order cutoff time and date, a dispatcher 64 first, at 66, utilizes a delivery route system to assemble orders into desired delivery routes. Delivery routes can be created manually by the dispatcher or another person, or the dispatcher computer 38 and server 22 can be programmed to create the desired delivery routes. Further, there are various known strategies that may be implemented to create desired delivery routes. Thereafter, at 68, the orders on each delivery route are assigned to one or more pick routes. Another feature of the online shopping system 20 is the utilization of pick zones and pickers that have a preference for a pick zone. Most often the pickers 74 are personnel who normally restock inventory in the store. Further, those personnel are most familiar with the location, brand names, age and quality of items in the area or zone of the store that they restock. For example, a person who normally works in the produce department is familiar with the location of the different types of produce, the age of the produce and its quality. Hence, if that person is asked to do picking, he or she will operate most efficiently in, and have a preference to pick items in, the produce department. Similarly, a person who normally works in the pet foods area will have the physical capability of being able to pick and handle the heavier pet foods packages.

In the picking process, a picker utilizes a pick cart that is more fully described in U.S. patent application Ser. No. 10/078,041, entitled WHEELED CART FOR FILLING GROCERY ORDERS, filed Feb. 19, 2002, which application is hereby incorporated in its entirety by reference herein. The picker computer 42 is located on the pick cart; and upon a picker becoming available to pick items, the picker utilizes the picker computer 42 to log in to the server 22. To facilitate the picking process, the store is divided into pick zones. A pick zone is an area of the store 36 having goods with a common characteristic. For example, one pick zone may include only frozen foods, a second pick zone include only refrigerated goods, a third pick zone include only produce, etc. Thus, goods in a pick zone may have special temperature storage and handling requirements, for example, frozen and refrigerated goods. The process of dividing a particular store into pick zones is often done by the system administrator. In addition, the system administrator enters data into the system that associates a picker with a preferred pick zone.

When a picker logs on to a picker computer, the identity of the picker is confirmed using the employee database 30. Upon the online shopping system 20 detecting that a picker 74 has signed in, the server 22, dispatcher computer 38 and picker computer operate together to automatically create a pick route that assigns pick zones to the picker with which the picker is familiar. The pick route is displayed on the picker computer 42. Pick routes can also be created manually by the dispatcher. While more than one order can be picked on any pick route, each pick route is prioritized to only one delivery route. In other words, the system attempts to assign a picking route to a single delivery route or truck; and therefore, the probability of inadvertently providing items on an order to the wrong delivery route is minimized.

The pick list identifies the items to be picked in each zone on the pick route. The items are listed in the order that they should be picked and therefore, define exactly how a picker should proceed along the pick route. The location of the items are often defined by isle shelf designations. Further, the pick list identifies the customer order associated with the item picked. A pick cart has the capability of picking items for up to six orders associated with a particular delivery route. As indicated earlier, a pick route is prioritized to only one delivery route; and a pick list will include items that are associated with orders on different delivery routes only when single route prioritization is not possible. That pick route creation process substantially improves the efficiency of the picking process and minimizes the probability of picking the wrong goods, picking goods that are damaged, or picking goods that a customer would find unacceptable.

The picker 74 then, at 76, proceeds to move through each zone and pick the items in the order that they appear on the list. As each item is picked, the picker 74 scans its uniform pricing code ("UPC") and then places it in a grocery bag for the appropriate order. As each item is scanned, the UPC is transferred via the picker computer 42 back to the order database 24 that keeps track of the current status of all customer orders. When a grocery bag is filled, as determined at the discretion of the picker, the bag is closed; and the picker 74 utilizes the picker computer 42 to print a bag label having a bag identification code, temperature handling requirement and the customer order number thereon. Thereafter, the picker 74 delivers the bagged items to a destination which may be a staging area or a delivery truck. As the bags are removed from the picker's cart, the picker scans the bag labels that indicate the identity of the bags. Both the delivery truck and the staging area have freezers as well as refrigeration compartments so that the temperature requirements of the items in the bags can be maintained. A delivery truck suitable for this application is more fully described in U.S. patent application Ser. No. 10/156,369, entitled GROCERY DELIVERY VEHICLE, filed May 28, 2002, which application is hereby incorporated in its entirety by reference herein.

After the picking process for an order is complete, the order is available for checkout and is transferred via the dispatcher computer 38 from the order database 24 to the point of sale computer 44 for pricing and settlement. The point of sale computer 44 is a computer that maintains a database of the prices of all the goods in the store 36. Normally, the computer 44 is also electrically connected to all of the checkout scanners and cash registers to provide pricing information thereto. In addition, the point of sale computer 44 is programmed to keep track of all available discounts and applicable coupons. After the order has been priced, the point of sale computer 44 then establishes contact with the customer's credit supplier and the order is settled.

Thereafter, a driver 80 uses a driver computer 40 to log in to the server 22. Again, the employee database 30 is utilized to confirm the identity of the driver 80. The driver computer 40 is normally a hand held device that may be mounted on a clipboard (not shown) in a known manner, and the clipboard is used to hold paperwork associated with the orders to be delivered. The driver computer 40 includes a keyboard or other data entry device as well as a display. The driver 80 first, at 82, logs in the starting time and mileage of the truck, and the driver computer 40 displays the address of the first delivery stop and customer comments, if any. In addition, the driver computer may display driving directions to that first delivery stop. When the driver reaches the first delivery stop, the driver computer displays the bags to be removed from the truck in order to satisfy the customer order at this first stop. As the driver 80 picks up each bag, the bag label is again scanned and that information is stored in the driver computer 40. After delivering the bags of goods to the customer, the driver then takes a credit card impression and a digital signature. If the customer refuses delivery of any goods, the UPC of those goods is scanned and stored in the driver computer. After the driver has completed all of the delivery stops, the driver, at 84, returns to the store 36. The driver docks the driver computer 40, and the information entered into the driver computer 40 during the delivery route is uploaded to the server 22 and stored in the appropriate one of the databases 24-30.

While the above process represents a normal operation of the online shopping system 20, the system has other actors. For example, a member proxy 86 is used to assist customers having questions about, or difficulty with, using the online shopping system. For example, a customer 60 who is confused by a particular screen can communicate via telephone with a member proxy 86. The member proxy 86 utilizes a computer 88 that is also in electrical communication with the server 22; and thus, the member proxy has access to all of the customer information in the order database 24 and can lead the customer 60 through their difficulty. In other situations, a customer may not have access to the online shopping system 20; and the member proxy 86, via telephone communication with the customer 60, can use the online shopping system 20 to place an order in the name of the customer 60. Thus, the member proxy 86 is involved in an order prior to the order cutoff time and date. It should be noted that the member proxy computer 88 can be at any desired location, for example, at one of the stores 36, with the server 22, or at a location remote from the stores 36, 46 and the server 22. Further, the member proxy can serve more than one of the stores 36, 46.

If a customer has difficulty with an order after the order cutoff time and date, the customer can submit a service request via the online shopping system 20; and that request is assigned to a customer service representative 90. Alternatively, the customer service representative 90 can be in direct contact with the customer by telephone. The customer service representative 90 utilizes a customer service computer 92 to access the customer order information in the order database 24 and can authorize resolutions of errors that occurred in the customer order. The resolution of those errors is normally effected by the customer service representative 90 providing requests to the dispatcher 64; and the order is fixed by utilizing the online shopping system 20 in a manner similar to that previously described. As with the member proxy 86, the customer service computer 92 can be located at one of the stores 36, 46, with the server 22, remote from the stores 36, 46 and the server 22 and can serve more than one of the stores 36, 46.

Providing satisfactory customer service for an online grocery shopping system is challenging for several reasons. First, an online grocery shopping system involves a very high volume of items that must be accurately picked and delivered. Second, there are widely differing perceptions by customers as to the quality of food items. Third, by its nature, an online grocery shopping system is integrated into the daily activities of a customer, is complex, and thus, will probably precipitate a greater number of customer concerns and questions than other online ordering systems. Attempting to handle and resolve all of those customer issues, concerns and questions via traditional customer service strategies, for example, having a large number of customer service representatives available by phone, is exceedingly costly.

Therefore, the online shopping system 20 has an architecture that facilitates a user friendly customer service capability. The customer computer 32, member proxy computer 88 and customer service computer 92 are all connected to the server 22; but the customer 60, member proxy 86 and customer service representative access the order and registration databases 24, 26 via interfaces that permit coordinated but different activities. For example, the customer 60 can initiate a service request via the customer computer 32. That service request is acknowledged and acted on and resolved by a member proxy 86 or customer service representative 90 as appropriate. Further, while the service request is being processed, the customer can submit an online inquiry that reads a status of the service request. Thus, the online shopping system 20 can be used to provide customer service without the customer placing a telephone call. Being able to provide satisfactory customer service via the online shopping system 20 can substantially reduce the cost of customer service.

Having the customer computer 32, member proxy computer 88 and customer service computer 92 all accessing the order and registration databases 24, 26 has other advantages. The customer service representative creates and stores in the order database information relating to the customer, for example, information relating to the customer's payment history. Such information is available to the member proxy but not to the customer, but such information cannot be changed by the member proxy. Thus, the member proxy can advise the customer of limits to the transaction in accordance therewith. The integrated nature of the system permits the use of a system-wide bulletin board that is available to all actor computers 38, 40, 88, 92 except the customer computer 32 to advise those actors of current events and issues. Such a bulletin board can be maintained by the customer service representative or the system administrator or both.

Figure 3A:
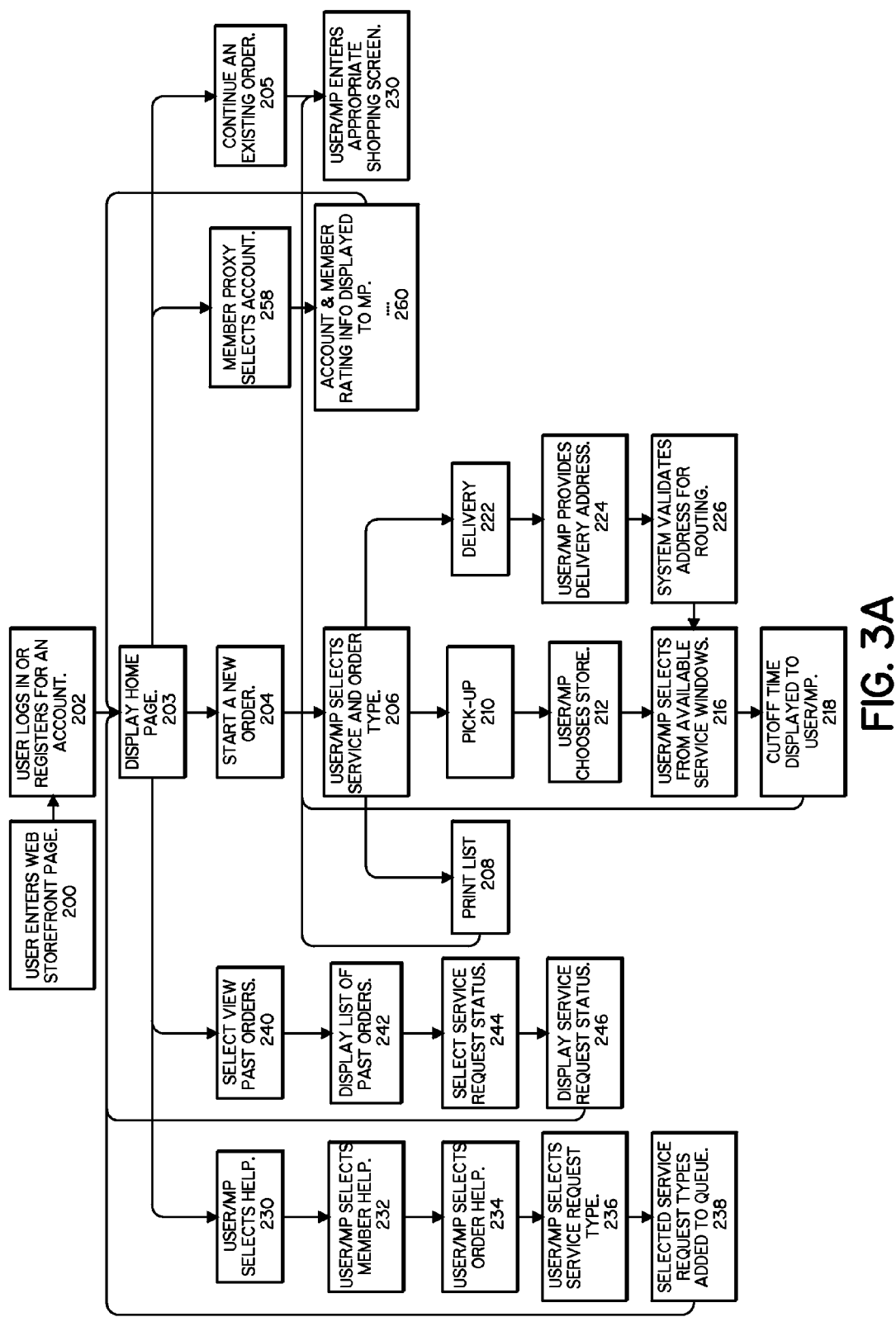
FIGS. 3A and 3B illustrate a flowchart of a process by which a customer can submit an order using the online shopping system of FIG. 1.
Figure 3B:
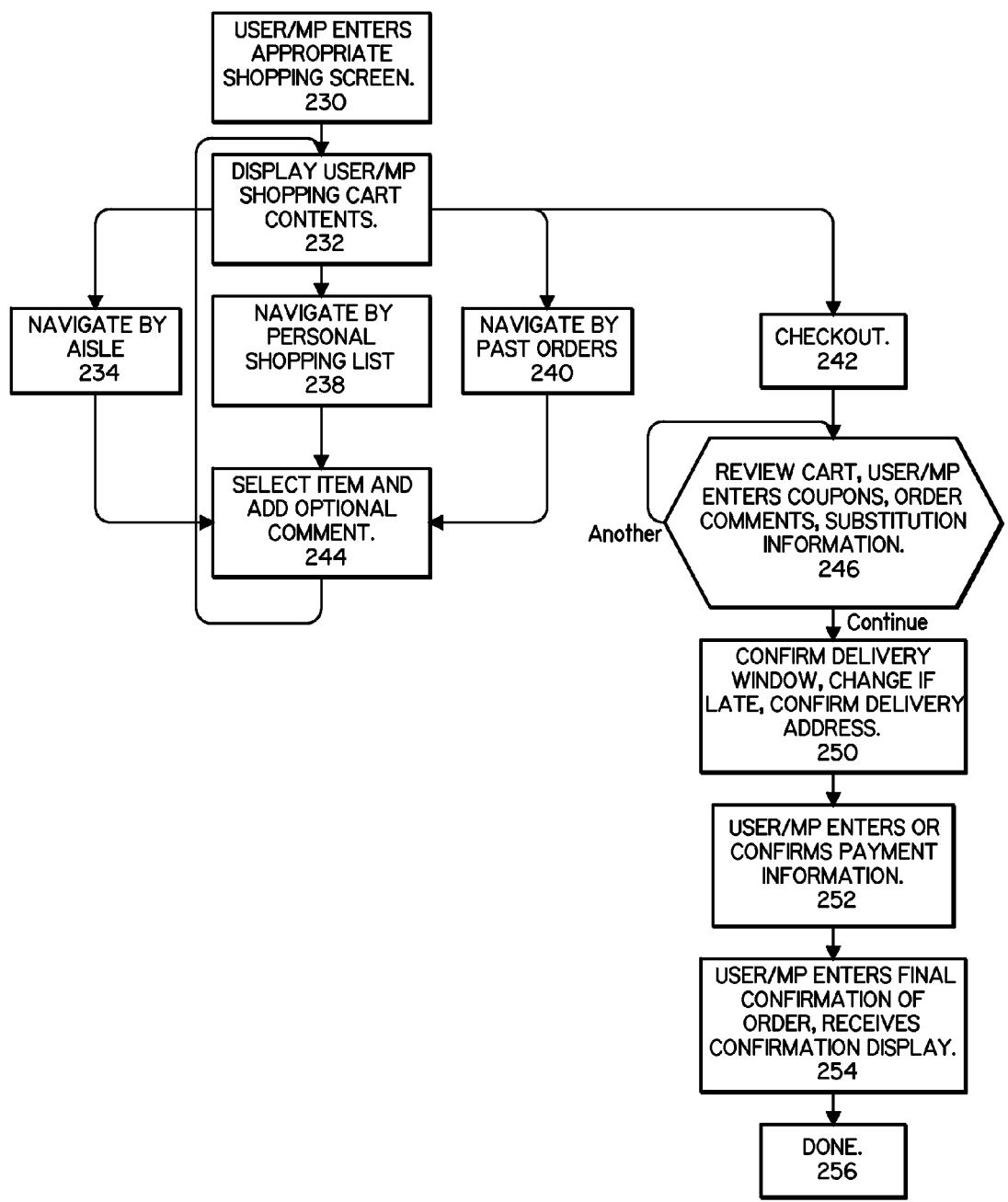

The activity of the customer of placing an order via the internet is further illustrated in FIGS. 3A and 3B. The customer first, at 200, utilizes the customer computer 32 to connect to the internet and go to a web store front page that provides the customer with the options of entering the system as a guest, a new member or a returning member. If a guest or new member, the customer is asked to enter a delivery address and a zip code; and that information is used by the server 22 to determine from the map database 28 whether the customer's address is available for service by the system. If not, the customer is so advised. If the delivery address is within the area of service, the customer is permitted to enter the system as a guest and may browse through the shopping system to determine the scope of its content. However, a guest will not be permitted to execute a transaction without becoming a member.

If the customer is not a member, the web store front page presents a registration option that permits, at 202, the customer to register with the shopping system. In that process, the customer opens an account and provides the necessary information relating to the customer identity and payment options in a known manner. That information is stored in the order database 24 and registration database 26 as appropriate. At this point, the customer can also select a desired substitution preference, for example, a customer may provide instructions indicating that items of a different size or a different brand are acceptable in the event that the ordered items are unavailable during the picking process. In addition, in the registration process, the customer agrees to the terms and conditions that include the pricing and fees associated with use of the home shopping system. Further, during the registration process, the customer indicates whether the customer is a business or residential client. A business client may also enter a tax exemption number and that is taken into account when the order is priced and settled after picking.

The term "customer" is used generically herein as a one who can potentially execute a commercial transaction, and "customer" is used interchangeably with "user" and "member". As will be appreciated and as is typical with online systems, if a customer or user has logged on to the online shopping system 20, that user is, by definition, a "member". Further, as is known, the system can recognize different types of members, for example, some member types may receive special discounts or other privileges based on a higher usage of the online shopping system 20. A customer or user who has never logged on to the system is by definition a "guest".

After, at 202, the customer has registered and/or logged on to the system, a home page is displayed at 203; and the customer is presented with the options of starting a new order at 204, continuing an existing order at 205, selecting help at 230, viewing past orders at 240, etc. If the customer chooses to start a new order at 204, the customer is then presented a screen in which the service type and order type are to be selected. Order type options include a grocery order, an event planning or catering order, a flower order, a liquor order, etc. The service options include delivery service, pick up service, print a shopping list service, etc. If a customer selects print a shopping list service at 208, the server 22 provides a printout listing the items selected by the customer in pick list order and their location in the store. Thus, the customer is able to visit the grocery store and efficiently pick the items, thereby minimizing their shopping time. If the customer chooses a pick up service at 210, a screen is presented, at 212, that requests the customer select a store at which the order will be picked up. If the customer selects a delivery service at 222, a screen is presented, at 224, requesting that a delivery address be entered; and the server 22 utilizes, at 226, the map database 28 to validate that delivery address for purposes of creating a delivery route. In that process, the server determines whether any ambiguities exist in the map database 28 with respect to the delivery address; and if so, the server 22 provides the customer with screens allowing the customer to enter data in order to resolve the ambiguities.

The customer then is presented, at 216, a display of available service windows. The determination of available service windows is dependent on both the service type and order type selected by the customer. For example, for a grocery order, there are four delivery service windows per day; and the customer is presented a display of the daily delivery windows for seven days in advance of the current date. In this example, delivery windows are from 8-10 a.m., 10 a.m.-12 p.m., 12 p.m.-4 p.m., 4 p.m.-6 p.m. The duration of the delivery windows may be varied by a system administrator. The customer can also request that delivery windows be displayed for dates further in the future. For grocery orders having a pick up service, the service windows may have a different duration, for example, a 15 minute duration. Normally, for pick up orders, available service windows for the current day and the next day are the only ones presented to the customer. For event planning or catering orders, the delivery windows are again tailored to that particular order type. Catering services are normally provided to businesses early in the morning and at noon and thus, delivery windows will be presented that are consistent with the nature of that business. For flower orders, only one delivery window per day may be presented; and for liquor orders, delivery windows are presented that are consistent with local laws governing the sale of liquor.

Figure 4:
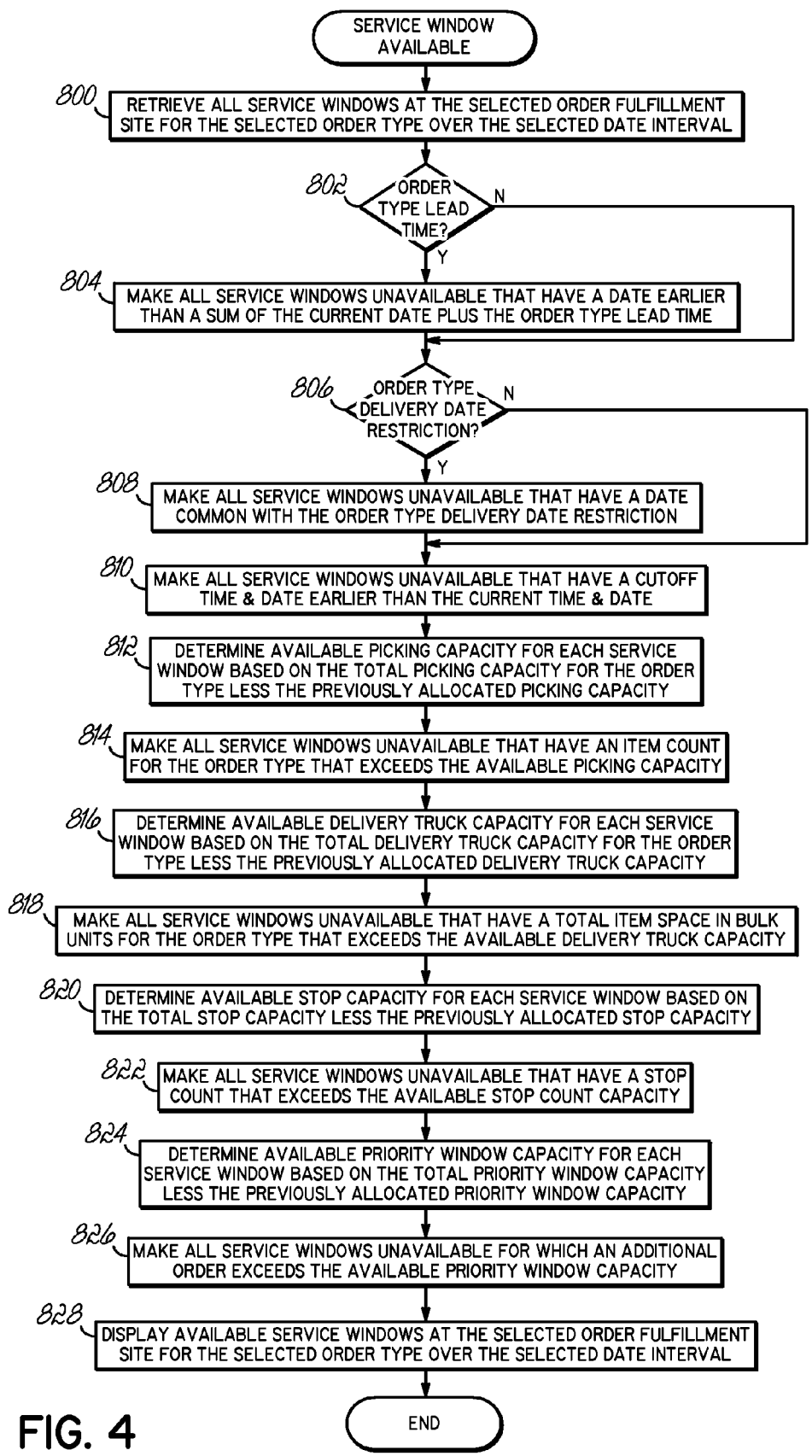
FIG. 4 is a flowchart of a process by which the online shopping system of FIG. 1 determines service windows for different order and service types.

Referring to FIG. 4, in determining the availability of a service window, the server 22 of the online shopping system first, at 800, retrieves from the order database 24, all service windows at the selected order fulfillment store for the selected order type over the selected date interval. Next, the server 22 determines, at 802, whether the selected order type has a lead time. For example, a catering order has a built in lead time of 24 hours. Thus, for that lead time, the server, at 804, makes all service windows unavailable that have a date earlier than a sum of the current date plus the order type lead time. Next, the server determines, at 806, whether the order type has a delivery restriction date. For example, some order fulfillment sites may have a restriction on the delivery of liquor. In that situation, at 808, all service windows are made unavailable that have a date common with the order type delivery date restriction. Thereafter, the server at 810, makes all service windows unavailable that have a cutoff time and date earlier than the current time and date.

The server, at 812, further determines available picking capacity for each service window based on the total picking capacity for the order type less the previously allocated picking capacity. In this calculation, the number of pickers available for each service window is determined. For a given order type and over a duration of a service window, a picker will have a threshold picking capacity. The picking requirements of current orders in a service window are known; and therefore, given the item picking threshold, the available picking capacity for a service window can be determined. If that capacity is less than that required for the service window being examined, the service window, at 814, is made unavailable.

Next, at 816, the available truck capacity is determined for each service window based on the total delivery truck capacity for the order type less the previously allocated delivery truck capacity for a respective service window. To make this determination of truck capacity, each item in the store inventory has been assigned a bulk unit value. For example, an arbitrary scale of 1-50 can be used, wherein a value of 1 represents a one ounce item and a value of 50 represents a 50 pound item. The size of the available trucks are also assigned a bulk unit value. With the above, the bulk units currently assigned to the service window can be determined. A bulk unit threshold for a particular service window is determined based on the duration of the service window; and a determination of the available bulk units for the service window is made. If the bulk units for the current order exceeds the available bulk unit capacity, that delivery window, at 818, is made unavailable to the current order.

In addition, the server 22 determines the available stop capacity for each service window based on the total stop capacity less the previously allocated stop capacity. Once again, for any service window, the system has determined a threshold number of stops that can be executed on a particular delivery route based on the duration of a service window. In addition, the system determines the previously allocated stop capacity for the orders already allocated to that window. The allocated stop capacity for any particular order is going to be dependent on the size of the order. Once the available stop capacity for a service window is determined, the server 22 proceeds, at 822, to make all service windows unavailable for orders that have a stop count that exceed the available stop count capacity.

The server also determines, at 824, the available priority window capacity for each service window based on the total priority window capacity less the previously allocated priority window capacity. Thereafter, at 826, the server makes all service windows unavailable for which an additional order exceeds the available priority window capacity. The server 22 then displays to the customer, at 828, all of the available service windows at the selected order fulfillment for the selected order type over the selected date interval.

Returning to FIG. 3A, upon the available service windows being displayed, the customer then, at 216, selects a desired window and that window selection is then confirmed to the customer along with, at 218, a display of an order cutoff time. The order cutoff time is established for the delivery windows depending on order and service type by a system administrator. For example, for the delivery of groceries, an order cutoff time may be 2.5 hours before the start time of the delivery window. Thus, the order cutoff time represents a lead time permitting the order to be picked prior to delivery. The order cutoff time is also the end of the time period available to the customer to change the order. As previously described, a customer can change an order after it has been submitted for fulfillment and the customer has logged off of the online shopping network.

Upon the customer accepting the selected delivery time, the server 22 presents, at 230 of FIG. 3B, a shopping screen to the customer. The shopping screen displays, at 232, the contents of a shopping cart containing items selected by the user. In addition, the customer can implement different shopping strategies. For example, a customer may compile different shopping lists that are stored in the system, and one or more of those lists can be selected, at 238, for display. Upon being displayed, the customer has the option of editing the list and then adding items on the edited list to the shopping cart. Alternatively, the shopper may choose to display, at 240, items purchased in past orders. Again, those orders can be edited, and the remaining items added to the shopping cart. The shopper may also choose to display, at 234, items associated with particular isles or departments in a store, for example, bakery, meats, produce, etc. At any time, as indicated at 244, the customer can enter comments in association with any item that is selected for addition to the shopping cart.

After the customer has selected all of the items for an order, a checkout option, at 242, is then selected; and the system provides a display, at 246, of the contents of the shopping cart. In this display, the customer is given the capability to select manufacturer coupons that the customer has for particular items. In addition, the customer is again able to select item substitution preferences as well as provide any additional comments. Upon the customer confirming the contents of the delivery cart, the system presents, at 250, a display permitting the customer to confirm the delivery address and the time and date of delivery. At this point, the customer has the option of changing either the address or time and date of delivery. Upon the customer accepting the delivery address and delivery time and date, the customer is then presented, at 252, with a display relating to the terms of payment. In this screen, the payment type, credit supplier and other information associated with customer's payment for the order is collected and confirmed in a known manner. Thereafter, the system, at 254, presents a display representing a final confirmation of the order, the delivery information, the payment information and any comments that have been entered by the customer. This display represents the last opportunity for the customer to change that information prior to submitting the order for fulfillment and logging off of the online shopping system at 256.

However, with the online shopping system 20, as long as the time and date of submission of the order by the customer is earlier than the order cutoff time and date, the customer can always re-log in to the system, at 202 of FIG. 3A, and select continue an existing order, at 205. The customer is then taken to the shopping screen, at 230, and the customer has the ability to change the order in any way. This capability provides substantial flexibility and value to the customer of the online shopping system 20. It should be remembered that most grocery type online shopping systems must enforce a minimum order value in order to provide an economically viable service. Thus, an order value that is below the minimum is either not accepted or subject to a significant premium charge. Hence, the customer, without the capability of being able to change the order after its submission either, has to forego the item or, have customer service intervene and change the order. That option adds a substantial cost and time burden to customer service for the online shopping system.

It should be noted that the option to continue an existing order, at 205, may arise under other circumstances. For example, when a customer is engaged in an online shopping session, the session may be voluntarily or involuntarily interrupted. The online shopping system 20 stores the state of the shopping session; and therefore, a customer can subsequently re-log in to the system and at 205, continue with the shopping session at the point where it was terminated.

Figure 5:
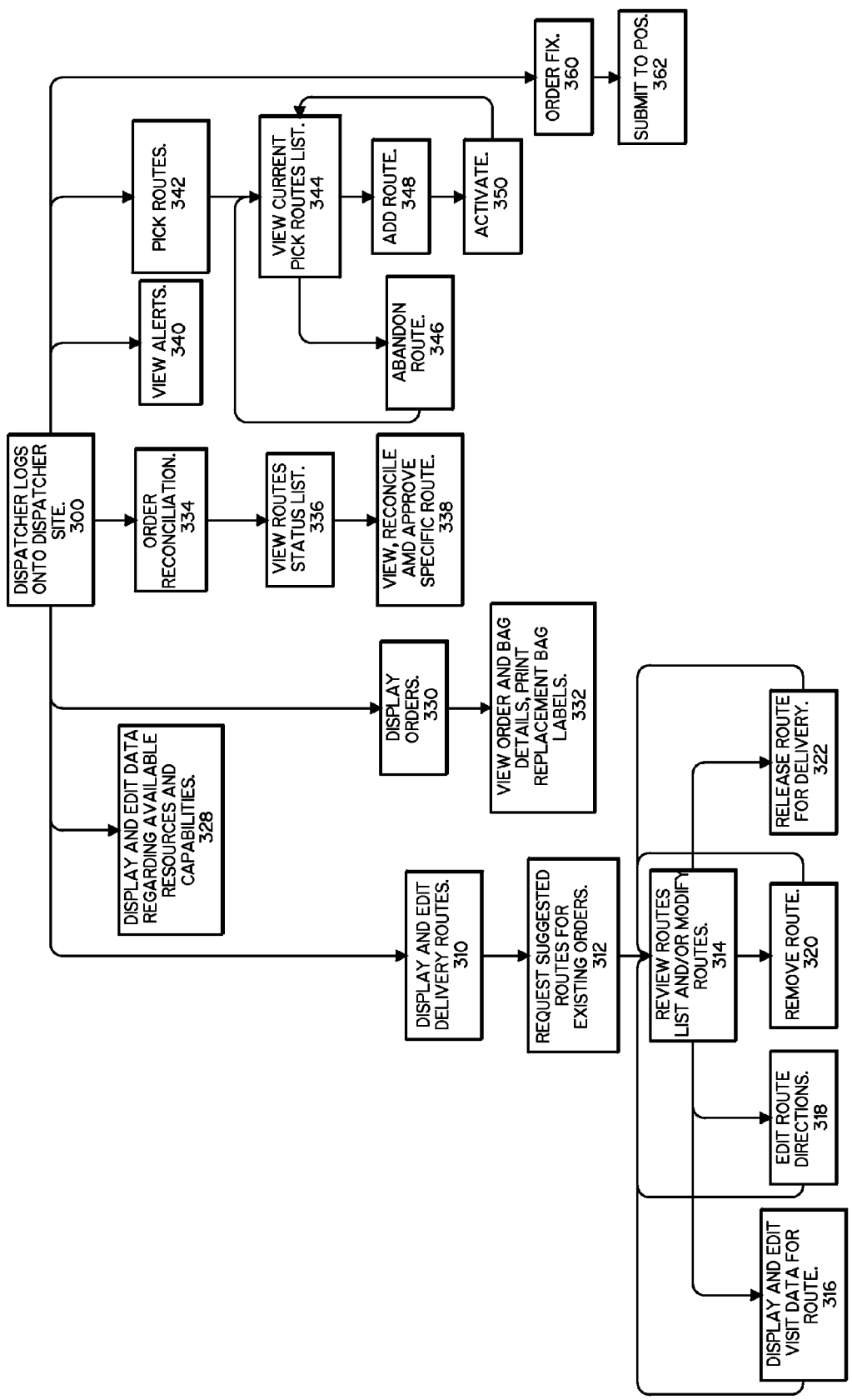
FIG. 5 is a flowchart of an order fulfillment process for the online shopping system of FIG. 1.

The submitted order is stored in the order database 24 of the server 22. Upon the order cutoff time for a particular delivery window expiring, a dispatcher 64 (FIG. 2) located in the store executes a dispatching program on the dispatcher computer 38 that is in electrical communications with the server 22. Referring to FIG. 5, upon the dispatcher logging on, at 300, to the dispatcher computer 38, a display having numerous options is presented. A dispatcher may first choose to view, at 340, alerts that exist in the system. The online shopping system monitors the items ordered by a customer; and if an item has a particular lead time, an alert is created so that the dispatcher can place orders for the item, if appropriate. The dispatcher may further choose to review, at 328, the resources and capabilities available to the store for servicing the orders. For example, the dispatcher can choose to edit various parameters associated with the order fulfillment process, such as, parameters relating to an average pick time, an average truck turnaround time, an average truck stop time, etc. The dispatcher can also edit the number and description of trucks available for delivery. Further, pick zones can be added, deleted or changed by the dispatcher.

In addition, the dispatcher may choose, at 310, to display and edit delivery routes. The dispatcher has an option to ask the system to suggest delivery routes for the orders for which the delivery cutoff time and date has expired. There are many algorithms for constructing delivery routes based on available orders. For example, some algorithms utilize zip codes for constructing delivery routes. Other algorithms use geographic polygons that are definable based on population density, round trip travel time from the store, truck capacity and economics. The advantage of geographic polygons is that they can be adjusted on a system level as required to optimize the round trip travel time and economics. The system then, at 314, displays a route list; and the dispatcher has the capability to edit and modify a route. For example, the dispatcher can, at 316, display and edit stop or visit data for the route or, at 318, edit the route directions. The dispatcher has the further capability, at 320, to remove a route. After the dispatcher is satisfied with the route, the route is released, at 322; and the dispatcher is returned to the display, at 314, in which routes are reviewed.

The dispatcher can also choose to manage pick routes at 342; and in response thereto, the system first displays, at 344, a summary list of the existing pick routes along with the identity of the picker and the pick route status. From this screen, the dispatcher has the options to abandon a pick route at 346 or add a pick route at 348. If add a pick route is chosen, a new display provides the identity of all pickers at the store. The dispatcher is also presented with options permitting orders to be added to the pick route; and after the dispatcher is satisfied with the new pick route, the dispatcher chooses, at 350, to release the pick route.

In addition, the dispatcher can choose to manage orders in the system; and in response to that option, the system displays a list of current orders, respective service types and windows and status. The dispatcher can then select an order and choose to view the order and bag details at 332. If necessary, the contents of a bag can be edited and a new bag label printed.

Figure 6:
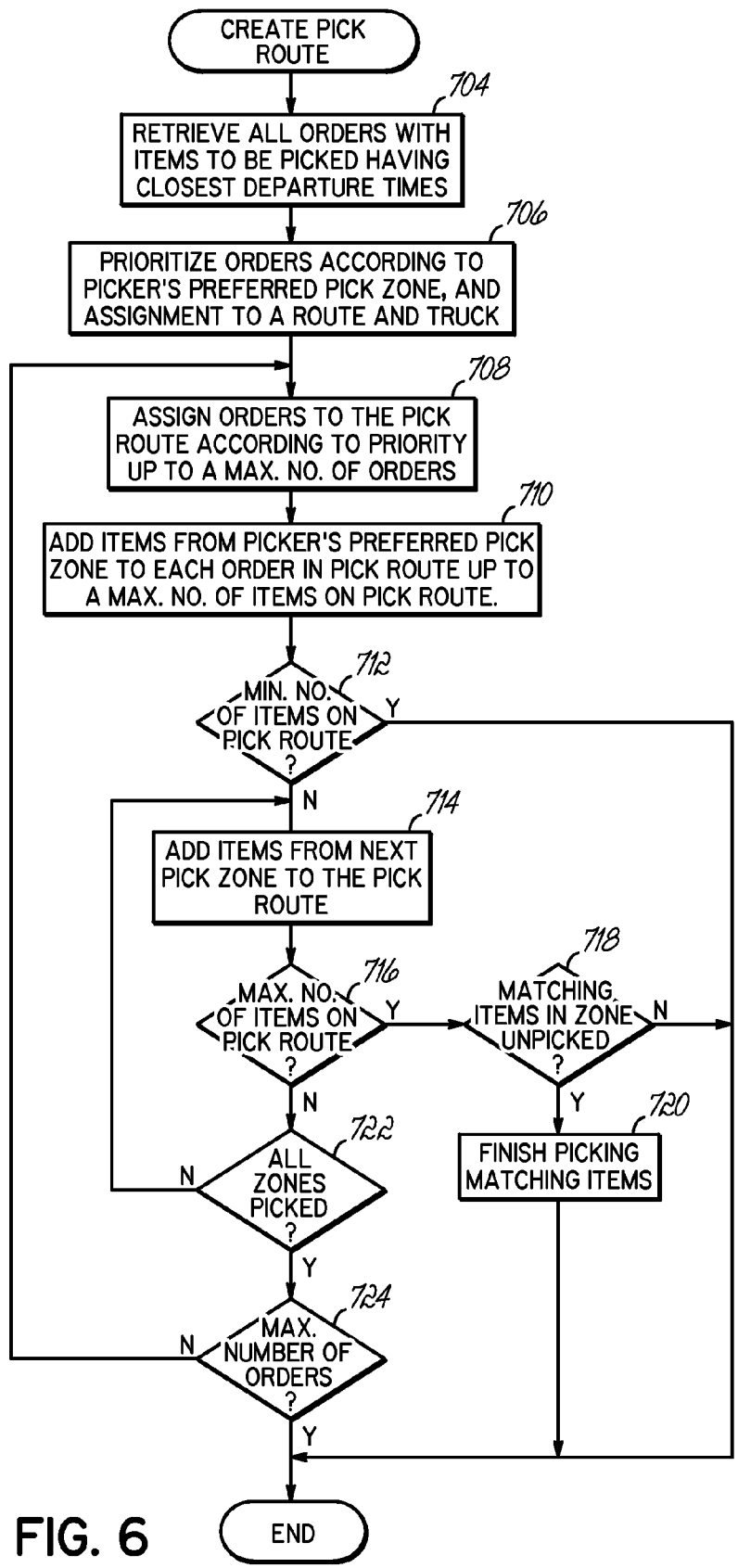
FIG. 6 is a flowchart of a process by which pick routes are created in fulfilling orders using the online shopping system of FIG. 1.
Figure 7:
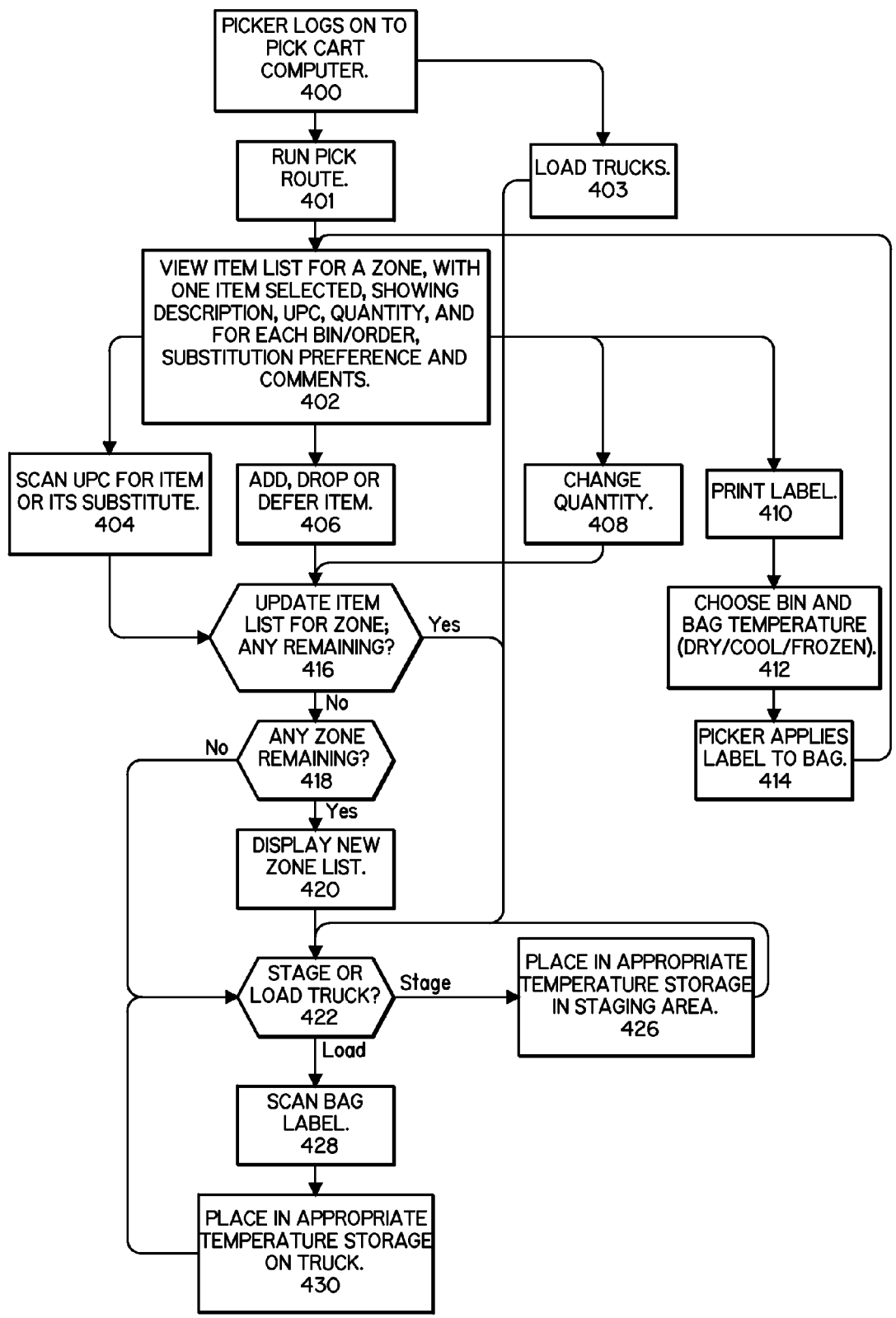
FIG. 7 is a flowchart of a picking process utilized with the online shopping system of FIG. 1.

After the order cutoff time, orders are available to be picked; however, the picking of orders is prioritized on the basis of picker preference and the orders being assigned to a delivery route. Upon becoming available, referring to FIG. 7, a picker first, at 400, logs on to a picker computer 42 on a pick cart. The picker then has an option to run a pick route or load trucks. Upon choosing to run a pick route, the server computer 22 then creates a pick route for that picker in accordance with the process of FIG. 6. First, at 704, all orders are retrieved with items to be picked that have the closest departure times. Next, at 706, the orders are prioritized according to the picker's preferred pick zone and assignment to a route and truck. For example, orders that have items in the picker's preferred pick zone that are assigned to a delivery route with a delivery truck have the highest priority. The next priority is assigned to orders that have items in the picker's preferred pick zone and are assigned to a delivery route but that have not yet been assigned to a truck. Orders that have items in the picker's preferred pick zone but have no delivery route or no truck assignment have the third highest priority. Thereafter, orders that are assigned to a delivery route with a truck have the fourth highest priority. Orders that are assigned to a delivery route but do not have a truck assignment have the fifth highest priority, and all other orders have the lowest priority.

Thereafter, at 708, orders are assigned to the pick route according to priority up to a maximum number of orders. For example, a pick cart has a maximum capacity of six totes; and therefore, the maximum number of orders that would normally be assigned to a pick route is six. Then, at 710, items are added from the picker's preferred pick zone to each order in a pick route up to a maximum number of items. When the maximum number of items for a pick route is reached, the pick route is considered complete. Thereafter, at 712, the pick route is tested for the minimum number of items. If the minimum number of items exist, then the pick route is complete. However, if the number of items is below the minimum, items are added from another pick zone to the pick route. As each item is added to the pick route, a test, at 716, determines whether the maximum number of items has been reached. If not, and if it is determined, at 722, that all zones have not been picked, the process returns to add another item, at 714. The process iterates until the test, at 716, determines that a maximum number of items on the pick route has been reached. Thereafter, at 718, a determination is made whether there are any items in the pick zone that match the item previously picked. If so, the matching items are added, at 720, to the pick route and the creation of the pick route by the dispatcher computer 38 is complete.

The server computer 22 then downloads the pick route to the picker computer 42, and the picker computer 42 provides, at 402, a display with numerous options to the picker. The display first includes a listing of items to be picked within a pick zone, and the display highlights the first item to be picked. The display further provides a description of the item, its UPC, desired item quantity, order number, substitution preference and customer comments. The picker has the capability, at 406, to add, drop or defer an item as well as, at 408, to change the quantity of an item. If the picker decides to pick the item, the picker scans the item UPC; and the UPC is displayed, at 404. The picker computer then, at 416, updates the item list display, at 402, by highlighting the next item to be picked and displays the scanned UPC. The picker places the scanned item into a bag on the pick cart.

The process of picking items and scanning the UPCs continues until the shopping bag in which the items are being deposited is full. At that point, the picker chooses, at 410, to print a label. A succeeding display requires that the picker confirm the order number, the bin number on the pick cart in which the bag is to be placed associated with the order number and the temperature at which the contents of the bag are to be maintained, for example, dry, cool, frozen, etc. Thereafter, the picker enters a print label command; and a printer on the pick cart prints a label. The picker, at 414, applies the label to the bag. The picking process continues until it is determined, at 416, that all items for that zone have been picked. Thereafter, the picker computer determines whether items in another zone are to be picked; and if so, a new zone list, at 420, is created and included within the display at 402.

When it is determined, at 416 and 418, that all items for all zones are picked, the picking process is complete, and the picker computer 42 provides the picker with the option to unload the pick cart. Upon choosing that option, the picker computer 42 provides the picker with the options, at 422, of stage items or load trucks. If the picker chooses to stage a load, the picker places, at 426, the bags in the appropriate temperature zone in a staging area. Alternatively, the picker can choose to load a truck; and in that event, the picker at 428, scans the bag label and, at 430, places the bag in the appropriate temperature zone in the truck. That process continues until all of the bags on the pick cart have been staged at a desired location or loaded in a truck. It should be noted that if a picker chooses from the picker home page at 400 to load trucks, the process of scanning a bag label at 428 and placing the bag on the truck is repeated.

Referring to FIG. 2, after the order has been picked, it is then ready for checkout, at 78. The dispatcher computer 38, upon reviewing the status of orders in the order database 24, determines that picking for an order is complete; and the dispatcher computer then submits that order to the point of sale computer 44 for pricing and settlement. In this application, the point of sale computer is connected to the checkout registers at a store and contains all of the current pricing, discount and coupon data. Thus, the point of sale computer reviews each item on the order including any applicable coupons, discounts, tax exemptions, etc. and assigns a net price thereto. When the order has been priced, the point of sale computer 44 then proceeds to contact the credit supplier of the customer and settle the order with the credit supplier. As shown in FIG. 5, a dispatcher screen provides, at 360, an order fix option 360. By selecting that option, the dispatcher obtains a display of all orders in the system that includes the order number, the point of sale status, the service window and any errors that have occurred. The dispatcher then determines whether any errors were detected by the point of sale computer 44. Upon reviewing those errors, the dispatcher can make changes to the order and, at 362, resubmit the order to the point of sale computer 44. When the order pricing is completed, the order along with the pricing and settlement data is then transferred via the dispatcher computer 38 to the order database 24 within the server 22.

Figure 8:
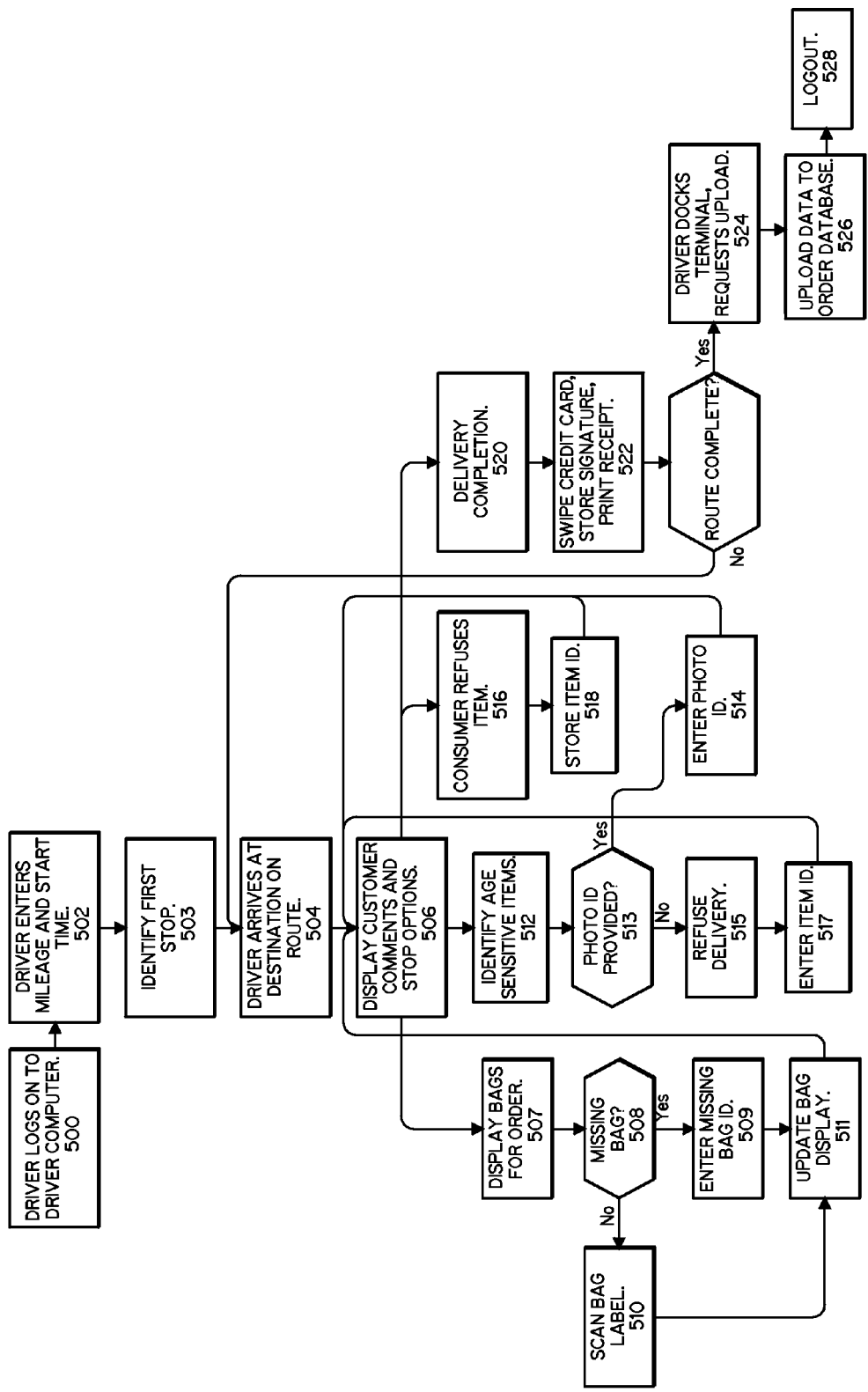
FIG. 8 is a flowchart of a process executed by a driver of a delivery truck in delivering orders to customers using the online shopping system of FIG. 1.

When the pricing and settlement is complete for all orders on a delivery route, all order information for that delivery route is downloaded to a driver computer 40 for a driver that is assigned to that delivery route. In addition, delivery route information relating to the stops on the delivery route is printed and placed on a clipboard in association with the driver computer. When the driver is available to run the delivery route, referring to FIG. 8, the driver first, at 500, picks up the driver computer 40 and clipboard containing information relating to the delivery route. The driver then proceeds to log in to the driver computer 40; and immediately prior to leaving the store, the driver, at 502, enters the truck mileage and start time into the driver computer 40. The driver computer then displays the first destination or stop on the delivery route and if commanded, also displays driving directions to the first stop.

Upon the driver providing an input, 504, indicating an arrival at the first stop, the driver computer 40 then displays, at 506, the customer comments and selections for the various driver activities. Upon the driver choosing to unload the truck, the driver computer displays, at 507, a list of the bags in the order in which they are to be removed from the truck and respective temperature storage locations. The driver then attempts to retrieve the first bag. If the driver, at 508, determines that the bag is missing, the driver enters the identity of the missing bag into the driver computer. That missing bag identity is entered and stored, at 509; and the bag display is updated at 511. If the driver is able to retrieve the first bag, the driver then proceeds, at 510, to scan its label; and, at 511, the display of the driver computer is updated to highlight the identity of the next bag to be retrieved. That process is repeated until the display of the driver computer 40 indicates that all of the bags for that order have been retrieved.

The driver also has the option of requesting a display of items that are sensitive to the age of the customer, for example, liquor and tobacco. In response to that request, the driver computer 40 displays, at 512, a list of age sensitive items in the order. The driver, at 513, requests age photo identification upon delivery; and if provided the driver enters, at 514, the age photo identification into the driver computer. If no identification is provided, the driver, at 515, refuses to deliver the age sensitive item, and enters, at 517, the identity of the age sensitive item into the driver computer, for example, by scanning its UPC. Sometimes the customer refuses to accept delivery of an item; and in that event, the driver selects, at 516, the customer refuse option and enters, at 518, the identity of the item into the driver computer 40.

When the delivery of the order is complete, the driver, at 520, selects a delivery complete option and proceeds, at 522, to obtain a swipe of the customer credit card and a digital signature for storage in the driver computer. Further, the driver prints a receipt for the customer and then checks the driver computer to determine whether the route is complete. If not, the computer displays the location of the next stop on the delivery route and the above-described process is repeated until the delivery route is complete. The driver then returns to the store and enters the mileage and time into the driver computer. Thereafter, at 524, the driver computer is connected to a docking station; and at 526, the data in the driver computer is uploaded to the order database 24 within the server 22. The driver then logs out of the driver computer at 528.

Referring back to FIG. 5, the dispatcher has, at 334, the option to reconcile an order after delivery. In the process of delivery, items may have been missing or the delivery refused, etc., which changed the value of the delivered order and that change in value must be reconciled with the original order price. In this process, the dispatcher is able, at 336, to review the various delivery routes and their current status. If it is necessary to reconcile an order on a delivery route, the dispatcher, at 338, can resubmit that order with the changes to the point of sale computer 44. The point of sale computer then again settles the order with the credit supplier and provides updated order information that is then transferred via the dispatcher computer 38 to the order database 24 of the server 22.

As previously discussed with respect to FIGS. 1 and 2, the online shopping system 20 includes the capability of a member proxy 86 utilizing a computer 88 to access the databases 24-30 within the server 22. The member proxy 88 acts under instructions provided by the customer who may, or may not, be logged on to the home shopping system online. The role of the member proxy 86 is to assist the customer in the ordering process up to the order cutoff time. Therefore, as shown in FIG. 3, a member proxy has an interface via the computer 88, which provides access to the databases 24-30 in substantially the same way as a user. Thus, the substance of the storefront interface illustrated in FIGS. 3A-3B is replicated in the member proxy interface. It should be noted however, that the member proxy interface differs from, and has more capability than, the user interface. For example, if, from the home page 203, the member proxy selects accounts, at 258 of FIG. 3A, member rating information is displayed to the member proxy at 260. Member rating information relates to characteristics of the customer, for example, special needs, credit rating, etc.; and that member rating information is not available via the user interface to the user. The member proxy interface also provides the member proxy the capability of changing fees associated with the order, changing the order fulfillment site, service request priority and other functions that are not available to the user. It should be further noted that the member proxy interface is entered as will subsequently be explained with respect to FIG. 9.

Another feature of the online shopping system is that a registered user or member, a member proxy or an unregistered user, that is, a guest, can submit an online service request. The process by which a guest submits an online service request is not illustrated in FIG. 3A, but is substantially similar to the process utilized by a user or a member proxy. Anytime a user desires to submit a service request, a member proxy or the user, at 230, selects help on the home page display of 203. At that point, various help topics are displayed and, at 232, member help is selected. Various member help options are then displayed, and at 234, the user selects order help. A display is then presented permitting the order number and other information to be entered. Service requests can be submitted that request service with respect to an order or request a change in information relating to the user, for example, a change of address, phone number, credit card, etc.

The display further provides a drop down list from which one or more service request types can be selected. Examples of service request types are missing item, incorrect charge, etc. The list of service request types displayed is different depending on which interface is driving the request. For example, a guest will have fewer service request types to choose from than a user or member proxy. Further, a member proxy will have a different list of service type requests than a user. The system automatically assigns a priority with respect to each of the service request types; and those priorities are fixed within the guest and user interfaces. However, within the member proxy interface, upon selecting a service request type, the member proxy may change the priority associated therewith. After a service request type is selected at 236, it is submitted, at 238, and added to a service request queue within the online shopping system 201.

As shown in FIG. 1, a customer service interface accesses the databases 24-30 of a server 22 via a customer service computer 92. A member proxy or customer service representative ("CSR") log in to the online shopping system through a customer service interface. In doing so, referring to FIG. 9A, the member proxy computer 88 and customer service computer 92 first, display a log in page at 600, thereby permitting the member proxy or customer service representative to log in to the customer service site. In response to a log in, the interface then displays, at 602, a customer service home page. The home page displays numerous options some of which are available to the member proxy and the CSR. For example, both the member proxy and the CSR can perform a member search, view an order, check delivery availability and view a bulletin board. It should be noted however, that only the CSR can modify and manage the bulletin board. Further, only the CSR has the capability of working with the service request queue and the service ticket queue.

If, at 604, a member search is selected, the customer service interface then displays a screen permitting data entries for member name, number, address, order number, etc. A search can be performed on any of those parameters; and upon entering the desired search criteria, a search is submitted. The results of that search are displayed, at 606, along with a member rating code. Given the search results, if a member proxy or CSR selects, at 608, an option to enter the member account, the system, at 610, moves to the shopping home page 203 of FIG. 3A. If the member proxy or CSR selects an option, at 612, to view the rating codes, the system then displays, at 614, the rating codes associated with the member or user found in the search. Member rating codes are entered and managed by a CSR but are viewable on various screens in the member proxy interface. Member rating codes relate to special characteristics associated with that member either in terms of special needs, credit rating, payment history, order limitations, etc.

If the member proxy or CSR selects, at 614, a new account option, the system then proceeds, at 616, to the log in page 202 of FIG. 3A. The CSR can also, at 618, select to view an order associated with a member found in the search. In response to that selection, the system displays, at 626, the details of the order. If a member proxy selects view an order at 615, the member proxy is routed, at 617, to the home page 203 of FIG. 3A, where either an order can be continued at 205 or a past order viewed at 240.

From the customer service home page, the member proxy or CSR can select, at 620, an order search. The system then displays a screen in which information may be entered relating to the member, delivery information, order information or service information. Upon entering the desired search criteria, the system then, at 622, displays the order search results. From that screen, the CSR and member proxy have different options. For example, if a member proxy select, at 623, a view order details option, the member proxy is taken to the home page 203 of FIG. 3A. From there, the member proxy can select to continue a current order at 205 or view a past order at 240, as is appropriate. In contrast, if, from the display of order search results at 622, a CSR selects, at 624, to view order details, the order details are then displayed, at 626. After reviewing the details, the member proxy or CSR may select, at 628, to view a service ticket associated with the order. The system then displays, at 658, the list of service tickets in progress.

Both the member proxy and CSR have the capability, from the customer service home page, to check, at 630, service availability. Upon selecting that option, the system then provides a screen, at 632, permitting the address of the user to be entered; and thereafter, at 634, the system displays whether there is delivery service available to the user in the area of the entered address.

Both the member proxy and CSR can from the customer service home page select, at 636, to view a bulletin board. The online shopping system bulletin board is accessible from all actor computers within the online shopping system except the customer computer 32, and system communications are provided system wide to all of the dispatchers, pickers, drivers, member proxies, system administrators and CSRs. Upon selecting to view the bulletin board, the system displays, at 638, various display options that relate to priority alerts, item information, office information, policies and miscellaneous information. Thus, the bulletin board can be used to quickly disseminate information to everyone working with the online shopping system. The display within a CSR interface provides to a CSR, at 638, a manage categories selection that is not available to others. If a CSR selects, at 640, to manage categories, the system then provides a display, at 642, having the options to add a category to the bulletin board, edit the category, delete the category or manage postings within any of the categories.

Figure 9A:
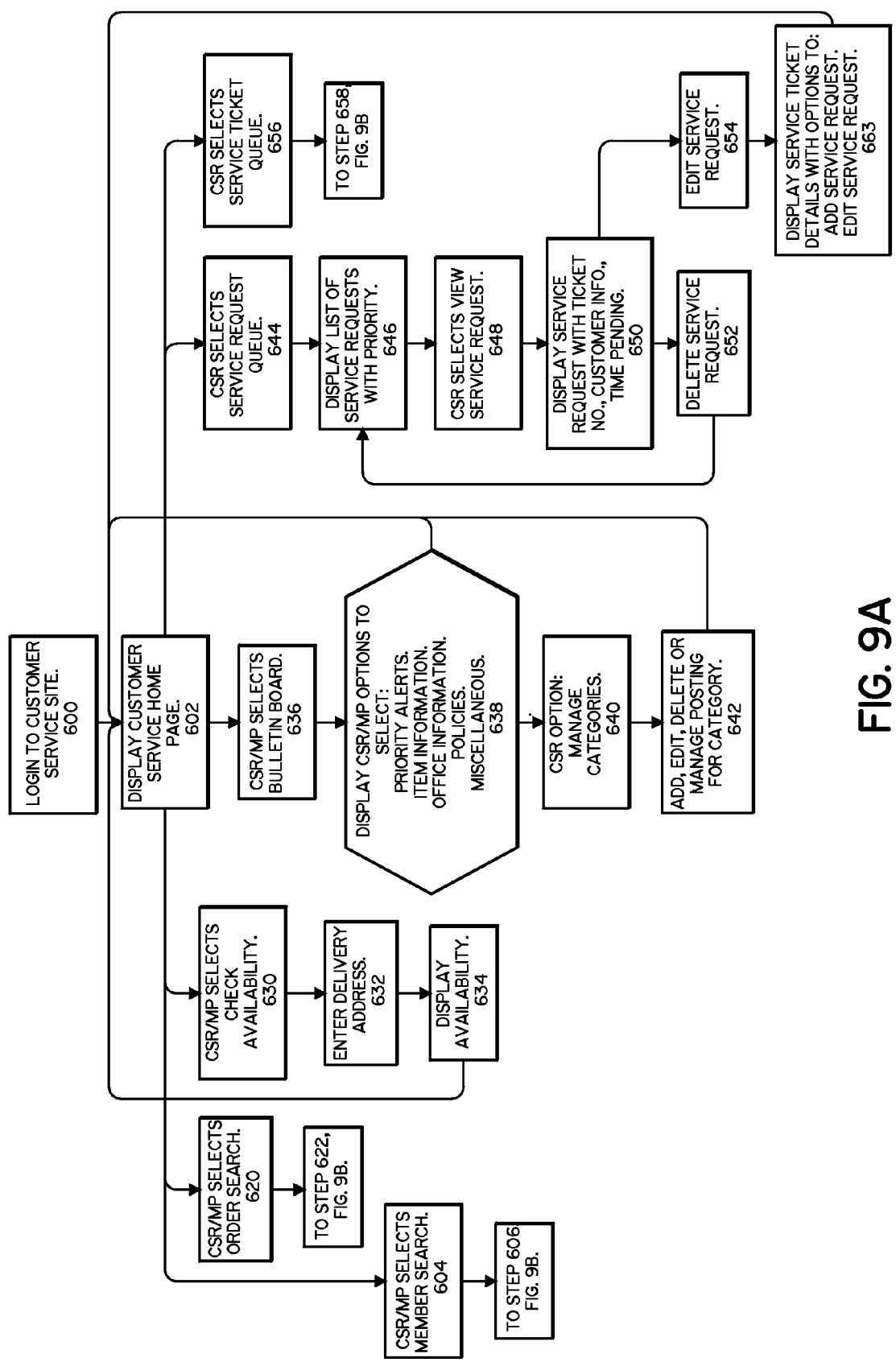
FIGS. 9A and 9B illustrate a flowchart of a process by which online customers are served by a member proxy and a customer service representatives using the online shopping system of FIG. 1.
Figure 9B:
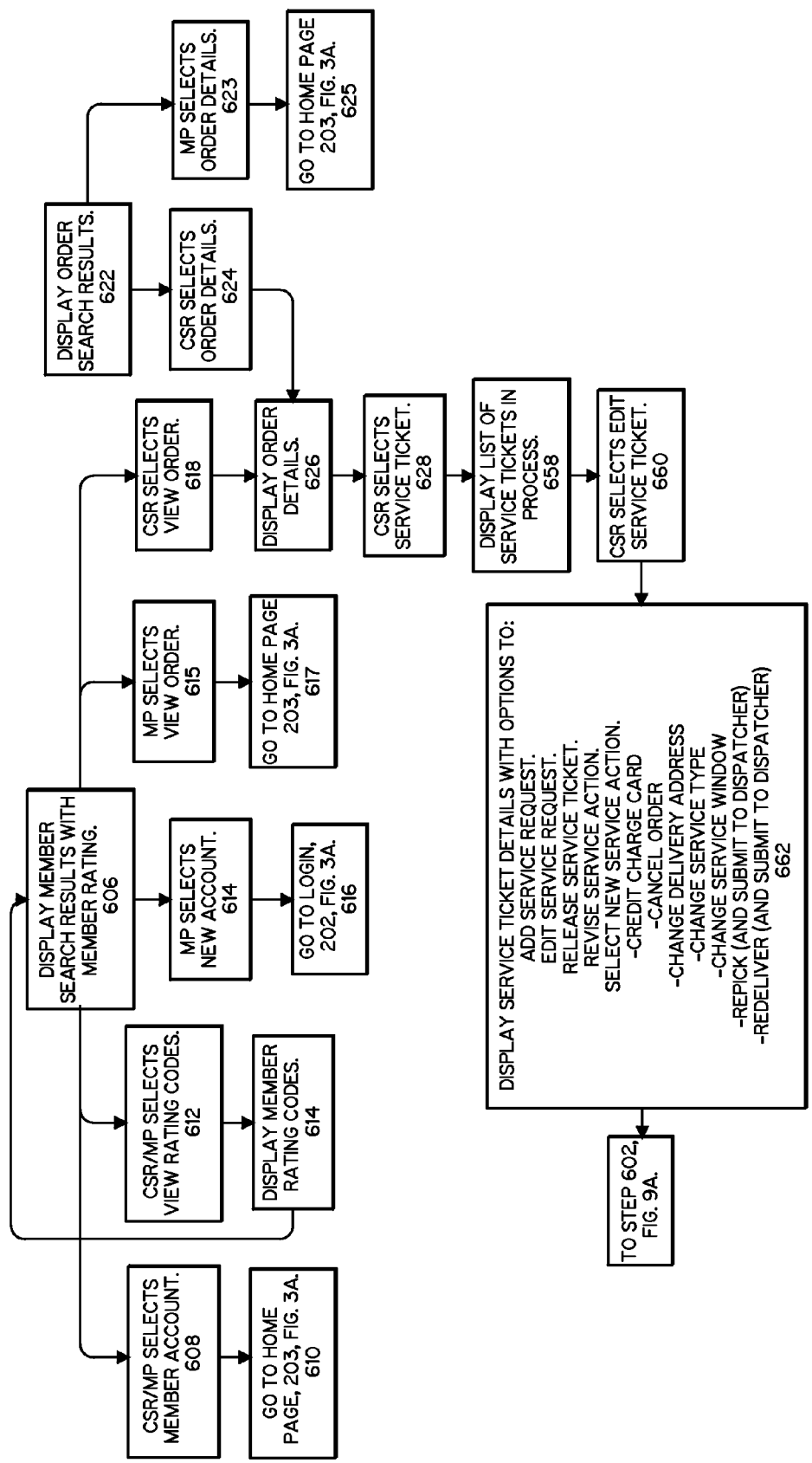

Referring to FIG. 9A, a CSR can select from the customer service home page an option, at 644, to view the service request queue. In response to that selection, the system then displays, at 646, a list of service requests along with the priorities. The display further includes an identity of the last CSR, if any, to work with the service request and the number of a service ticket to which the service request is assigned. The system maintains a single service ticket for each order; and therefore, that service ticket will be assigned to all service requests that are associated with that particular order. In addition, the system maintains a unique service ticket for each member over the life of the membership within the system. Thus, if a service request in the service request queue has a member number but no order number associated with it, the system determines that the service request relates to member information and assigns the service request to the member service ticket. If a service request in the service request queue does not have an order number nor a member number, the system determines that the service request was generated by a guest.

The CSR can highlight one of the service requests in the list and then select, at 648, to view the service request. The system then moves the selected service request from the service request queue to a service ticket queue and displays the service request, at 650, along with the service ticket number. In addition to the service ticket number, the display, at 650, also includes customer information, rating codes, comments associated with the service request and the length of time that the service request has been pending. The display, at 650, also provides the CSR with numerous options to display summary information relating to the member, the order or the service ticket and to display details of the service request. In addition, the CSR can select, at 652, to delete a service request or select, at 654, to edit the service ticket.

A CSR can also from the customer service home page select, at 656, to service the ticket queue. Upon that selection, the system, at 658, displays a list of all the service tickets in progress. The CSR highlights one of the service tickets and thereafter, at 660, selects to edit the highlighted service ticket. Thereafter, the system, at 662, displays the service ticket details along with numerous options for the CSR. For example, the screen has selections that permit the CSR to add a service request, edit a service request, release a service ticket, revise a service action or select a new service action. The options for a service action are selectable from a drop-down list of actions. The list of actions, several of which are shown at 662, also include, for example, charge a credit card, credit a money order, no action, retract an action, revise an action, cancel an order, redeliver, repick, retrieve, change delivery address, change service type, change service window, checked order status, etc. If the CSR chooses a repick option, the system provides a display of items on the order; and the CSR is able to select an item to be repicked. In addition, the CSR can add repick comments with respect thereto. After the items to be repicked have been selected, the CSR submits the repick service action to a dispatcher. The dispatcher adds the items to a pick route.

If a CSR chooses a repick action, it is also necessary for the CSR to choose a redeliver action. In response to that selection, the system provides the CSR with a screen identifying the available delivery windows. It should be noted that in response to a service request from a customer in which a small quantity of items is to be delivered, the CSR can select a window that is indicated as filled. Upon making the delivery window selection, the CSR then submits the delivery window information to the dispatcher so that the repicked items can be placed on the appropriate delivery truck for delivery to the customer.

With the online shopping system 20, a user or member proxy can, at any time, utilize the online shopping system to determine the status of a service request. To do so, the member proxy or user logs on to the shopping home page, at 203 of FIG. 3A. Thereafter, a selection is made to view past orders at 240. The system then, at 242, displays a list of past orders for the user. Each of the orders has associated with it a service request status link. Upon the user selecting, at 244, the service request status link, the system then, at 246, displays the status of the user's service request. Upon the user submitting, at 236, the service request to the online shopping system, the status is indicated as being received. Upon an CSR selecting, at 648 (FIG. 9), a service request from the service request queue, the status of the service request is changed to pending indicating that the request is being serviced. After action on the service request, at 662, is taken, the CSR selects an option to release the service ticket; and at that point, the status of the service request is changed to completed, thereby indicating to the customer that the service request has been satisfactorily addressed within the online shopping system.

It should be noted that the above-described customer service provides comprehensive assistance throughout the entire online shopping experience. Further, the customer, dispatcher, picker, driver, member proxy and CSR have interfaces unique to their responsibilities that access the databases 24-30 on the server 22; and therefore, there is a high level of integrity of data being presented to all actors within the system. Further, the comprehensive nature of customer service within the online shopping system facilitates greater use of online customer service, thereby relieving that burden from personnel within a store. Further, the services provided by member proxies and/or CSRs can be performed at geographic locations that are remote with respect to the store.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment, examples are given with respect to how particular functions are accomplished. In one example, referring to FIG. 3A, service request status can be checked by selecting view past orders from the home page display. As will be appreciated, the online shopping system may provide other paths for displaying past orders from which the service request status can be checked. For example, after selecting help from the home page, an order help selection can be made that also provides an option for viewing past orders. Thus, as will be appreciated, the exact path that an interface provides for navigating to a function is not critical with respect to the claimed inventions.

As will be further appreciated, the online shopping system 20 has substantially more features that are discussed herein. FIGS. 1-9 and the associated detailed description are considered sufficient to provide support for the claimed inventions. However, the online shopping system has many features that are not covered by the claims and therefore, are not discussed herein. For example, the home page 203 permits a user to view items on sale, FAQs, information about the online service provider, careers therewith and gift suggestions, as well as use a store locator. Similarly, the various interfaces have many options that are not covered by the claimed inventions and are not discussed, for example, many screens allow screen information to be printed or faxed.

In the described application, the driver computer 40 requires a docking station to communicate with other computers in the online shopping system 20. As will be appreciated, in other embodiments, the driver computer 40 can be provided with wireless communications with one or more of the other computers in the online shopping system 20. Further, in the described system, while there is some description of the structure of databases and tables, in alternative embodiments other structures of databases and tables can be used. Similarly, in the described embodiment, a separate point of sale computer is used to maintain coupon and pricing information for the system. As will be appreciated, in other embodiments, the pricing information in the point of sale computer can be stored in other computers in the online shopping system.

Therefore, the invention in its broadest aspects is not limited to the specific details shown and described. Consequently, departures may be made from the details described herein without departing from the spirit and scope of the claims which follow.

What is claimed is:

1. A method of operating an online shopping system that permits a customer to submit online orders for items and/or services from a store that serves both walk-in customers and online customers, the method comprising:
    presenting identifications of items on a web page for selection by a customer,
    presenting an online display acknowledging the customer's selection of selected items;
    presenting an online display of an order cutoff time and an associated delivery window selected by the customer;
    presenting an online display permitting the customer to submit a purchase order for the selected items;
    receiving a submission of a purchase order for the selected items from the customer;
    comparing a time of submission of the purchase order to the order cutoff time associated with the delivery window selected by the customer;
    presenting an online display accepting the customer's submission of the purchase order for the selected items in response to the time of submission being before the order cutoff time;
    thereafter, picking the selected items for delivery;
    thereafter, pricing the purchase order for the selected items;

thereafter, settling the purchase order for the selected items with a credit supplier; and then, delivering the selected items to the customer.

2. A method of operating an online shopping system that permits a customer to submit online orders for items and/or services from a store that serves both walk-in customers and online customers, the method comprising:

presenting identifications of items on a web page for selection by a customer, presenting an online display acknowledging the customer's selection of selected items;

presenting an online display of an order cutoff time and an associated delivery window selected by the customer;

presenting an online display permitting the customer to submit a purchase order for the selected items;

receiving a submission of a purchase order for the selected items from the customer;

comparing a time of submission of the purchase order to the order cutoff time associated with the delivery window selected by the customer;

presenting an online display requesting the customer select another delivery window for the item in response to the time of submission of the purchase order being later than the order cutoff time;

thereafter, picking the selected items for delivery;

thereafter, pricing the purchase order for the selected items;

thereafter, settling the purchase order for the selected items with a credit supplier; and then, delivering the selected items to the customer.

3. A method of changing submitted online orders with an online shopping system that permits a customer to re-submit online orders for items and/or services from a store that serves both walk-in customers and online customers, the method comprising:

providing a database of items available for sale to a customer;

presenting online representations of the items for selection by a customer, presenting an online display acknowledging the customer's selection of selected items;

presenting an online display of an order cutoff time and an associated delivery window selected by the customer;

presenting an online display permitting the customer to submit an order for the selected items;

presenting an online display confirming receipt of a submitted order for the selected items by the customer including the delivery window and payment information;

thereafter receiving online instructions from the customer to change the submitted order; and presenting an online display confirming the change to the submitted order in response to receiving the online instructions prior to the order cutoff time;

thereafter, picking the selected items for delivery;

thereafter, pricing the order for the selected items;

thereafter, settling the order for the selected items with a credit supplier; and then, delivering the order of the selected items to the customer.

4. The method of claim 3 further comprising:

comparing a time of receipt of the online instructions to change the submitted order to the order cutoff time; and presenting the online display confirming the change to the submitted order in response to the time of receiving the online instructions being before the order cutoff time.

5. A method of changing submitted online orders with an online shopping system that permits a customer to submit online orders for items and/or services from a store that serves both walk-in customers and online customers, the method comprising:

presenting to a customer different service and order types, providing a database of items available for sale to a customer;

presenting online representations of the items for selection by a customer, presenting an online display acknowledging the customer's selection of selected items;

presenting an online display of an order cutoff time and an associated delivery window selected by the customer;

presenting an online display permitting the customer to submit an order for the selected items;

presenting an online display confirming receipt of a submitted order for the selected items by the customer including the delivery window and payment information;

thereafter receiving online instructions from the customer to change the submitted order; and presenting an online display requesting that the customer select another, later delivery window in response to the time of receiving the online instructions being after the order cutoff time;

thereafter, picking the selected items for delivery;

thereafter, pricing the order for the selected items;

thereafter, settling the order for the selected items with a credit supplier; and then, delivering the order of the selected items to the customer.

6. A method of settling submitted online orders with an online shopping system that permits a customer to submit online orders for items and/or services from a store that serves both walk-in customers and online customers, the method comprising:

presenting items on a web page for selection by a customer, presenting an online display acknowledging the customer's selection of first items;

presenting an online display permitting the customer to submit an order for the first items and authorization to pay for the order via a credit supplier;

presenting an online display acknowledging the customer's submission of the order for the first items;

thereafter, picking the first items for delivery;

thereafter, pricing the order for the first items;

thereafter, settling the order for the first items with a credit supplier; and then, delivering the order of the first items to the customer.

7. The method of claim 6 further comprising:

presenting an online display of an order cutoff time and an associated delivery window selected by the customer, the order cutoff time being earlier than initiation of picking of the first items;

receiving online instructions from the customer to change the order for the first items; and presenting an online display confirming the change to the order for the first items in response to receiving the online instructions prior to the order cutoff time.

8. A method of settling submitted online orders with an online shopping system that permits a customer to submit online orders for items and/or services from a store that serves both walk-in customers and online customers, the method comprising:

presenting items on a web page for selection by a customer;

presenting an online display acknowledging the customer's selection of first items;

presenting an online display permitting the customer to submit an order for the first items and authorization to pay for the order via a credit supplier;

presenting an online display acknowledging the customer's submission of the order for the first items;

thereafter, picking the first items for delivery;

thereafter, pricing the order for the first items;

thereafter, settling the order for the first items with a credit supplier;

presenting an online display of an order cutoff time and an associated delivery window selected by the customer, the order cutoff time being earlier than initiation of picking of the first items;

receiving online instructions from the customer to change the order for the first items;

presenting an online display requesting that the customer select another, later delivery window in response to the time of receiving the online instructions being after the order; and then, delivering the order of the first items to the customer.

9. The method of claim 8 further comprising presenting an online display including an identification of the credit supplier with the display acknowledging the customer's submission of the order for the item.

10. A method of determining available service windows for an online shopping system that permits a customer to submit online orders for items and/or services from a store that serves both walk-in customers and online customers, wherein a service window is a window of time during which items are provided to a customer in response to an online order by the customer, the method comprising:

presenting an online display permitting a customer to select one of multiple order types, each of the order types being limited to specific items and/or services not available with an other order type;

presenting an online display permitting a customer to select one of multiple service types, each of the service types having service windows with times and dates different from times and dates of service windows for an other service type;

receiving an online request from the customer to display available service windows for selected ones of the order and service types;

retrieving all possible service windows for the selected ones of the order and service types over a date interval;

identifying available service windows for the selected ones of the order and service types by eliminating service windows that have a time and date earlier than a current time and date plus lead times for the selected ones of the order and service types, and exceed system resources to pick and deliver items selected by the customer associated with the selected ones of the order and service types;

presenting to the customer an online display of the available service windows for the selected ones of the order and service types;

thereafter, picking selected items for delivery;

thereafter, pricing an order for the selected items;

thereafter, settling the order for the selected items with a credit supplier; and then, delivering the order of the selected items to the customer.

11. The method of claim 10 wherein the service types are selected from a group consisting of orders that are to be delivered to the customer, orders that are to be picked up by the customer and printing a list of items for the customer.

12. The method of claim 10 wherein the order types are selected from a group consisting of groceries, flowers, liquor products and catering services.

13. A method of determining available service windows for an online shopping system that permits a customer to submit online orders for items and/or services from a store that serves both walk-in customers and online customers, wherein a service window is a window of time during which items are provided to a customer in response to an online order by the customer, the method comprising:

presenting an online display permitting customers to select one of at least multiple order types, each order type being limited to specific items and/or services not available with another of the order types;

presenting an online display permitting a customer to select one of multiple service types, each of the service types representing a different service in providing items and/or services to a customer;

receiving online requests from customers to display service windows for respective selected ones of the order and service types;

selecting a first online request from a first customer to display service windows for one of the respective selected ones of the order and service types;

retrieving all possible service windows for the one of the respective selected ones of the order and service types over a time and/or date interval;

identifying available service windows for the one of the respective selected ones of the order and service types by eliminating service windows that have a time and date earlier than a current time and date plus a lead time for the one of the respective selected ones of the order and service types, and exceed system resources to pick and deliver items selected by the customer associated with the one of the respective selected ones of the order and service types;

presenting to the first customer an online display of the available service windows for the one of the respective selected ones of the order and service types; and servicing other online requests from customers to display service windows for others of the respective selected ones of the order and service types by iterating the above steps of selecting, retrieving, identifying and presenting for each of the other of the respective selected ones of the order and service types;

thereafter, picking selected items for delivery;

thereafter, pricing an order for the selected items;

thereafter, settling the order for the selected items with a credit supplier; and then, delivering the order of the selected items to the customer.

14. A method of operating an online shopping comprising:

providing different service types to a customer on a computer;

thereafter, providing different order types to the customer;

thereafter, displaying to the customer via the computer a set of available service windows when the order can be delivered or picked up at a store selectable by the customer;

thereafter, providing items for purchase by the customer;

thereafter, storing the customer's order in an order database in a server which is accessible by computers located in the store;

thereafter, picking items of the customer's order;

thereafter, pricing the customer's order for the selected items;

thereafter, settling the order for the items with a credit supplier; and then delivering the order to the customer.

* * * * *

UNITED STATES PATENT AND TRADEMARK OFFICE
CERTIFICATE OF CORRECTION

| | | |
|---|---|---|
| PATENT NO. | : 7,590,567 B2 | |
| APPLICATION NO. | : 11/548045 | |
| DATED | : September 15, 2009 | |
| INVENTOR(S) | : David B. Hopson et al. | |

It is certified that error appears in the above-identified patent and that said Letters Patent is hereby corrected as shown below:

Title Page, Column 1

Under the "Inventors" section, "Kemberly S. Keys" should be --Kimberly S. Keys--.

Column 1

Line 18, "internet" should be --Internet--.

Line 21, "internet" should be --Internet--.

Line 59, "internet" should be --Internet--.

Column 2

Line 20, "internet" should be --Internet--.

Line 37, "internet" should be --Internet--.

Column 6

Line 6, "internet" should be --Internet--.

Line 8, "internet" should be --Internet--.

Line 45, "internet" should be --Internet--.

Line 46, "internet" should be --Internet--.

Line 48, "internet" should be --Internet--.

Column 10

Line 40, "internet" should be --Internet--.

Line 42, "internet" should be --Internet--.

Column 14

Line 47, "has expired" should be --have expired--.

Column 25

Line 30, "after the order; and" should be --after the order cutoff time; and--.

Column 27

Line 6, "online shopping comprising" should be --online shopping system comprising--.

Signed and Sealed this

Thirteenth Day of April, 2010

David J. Kappos
*Director of the United States Patent and Trademark Office*